(12) United States Patent
Kang et al.

(10) Patent No.: US 12,321,582 B2
(45) Date of Patent: *Jun. 3, 2025

(54) METHOD FOR PROVIDING FILTER AND ELECTRONIC DEVICE SUPPORTING THE SAME

(71) Applicant: Samsung Electronics Co., Ltd., Suwon-si (KR)

(72) Inventors: Jiyoung Kang, Suwon-si (KR); Hangyul Kim, Suwon-si (KR); Woojin Jung, Suwon-si (KR); Nari Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

This patent is subject to a terminal disclaimer.

(21) Appl. No.: 18/305,886

(22) Filed: Apr. 24, 2023

(65) Prior Publication Data

US 2023/0259264 A1    Aug. 17, 2023

Related U.S. Application Data

(63) Continuation of application No. 17/168,806, filed on Feb. 5, 2021, now Pat. No. 11,662,898.

(30) Foreign Application Priority Data

Feb. 6, 2020   (KR) .................. 10-2020-0014431

(51) Int. Cl.
*G06F 3/04847*    (2022.01)
*G06F 3/0482*     (2013.01)
(Continued)

(52) U.S. Cl.
CPC ............ *G06F 3/04847* (2013.01); *G06T 5/20* (2013.01); *G06V 10/507* (2022.01); *G06V 10/56* (2022.01);
(Continued)

(58) Field of Classification Search
CPC ........ H04N 23/62; H04N 23/63; H04N 23/80; H04N 23/631; H06T 5/20; H06T 2200/24;
(Continued)

(56) References Cited

U.S. PATENT DOCUMENTS 9,076,258 B2   7/2015  Kass et al.
9,122,752 B2   9/2015  Bill
(Continued)

FOREIGN PATENT DOCUMENTS

KR   10-2018-0074977 A   7/2018
KR   10-2019-0138436 A   12/2019
WO   2019/028472 A1      2/2019

OTHER PUBLICATIONS

Liu et al., AutoStyle: Automatic Style Transfer from Image Collections to Users' Images, Computer Graphics Forum: Journal of the European Association for Computer Graphics, vol. 33, No. 4, Jul. 15, 2014.

(Continued)

*Primary Examiner* — Kelly L Jerabek
(74) *Attorney, Agent, or Firm* — Jefferson IP Law, LLP

(57) ABSTRACT

An electronic device is provided. The electronic device includes a display, a processor functionally connected with the display, and a memory functionally connected with the processor. The memory stores instructions configured to, when executed, enable the processor to display a first image through the display, display one or more second images through the display while displaying the first image, select a third image from among the one or more second images, identify a value of at least one property of the third image, generate a filter for applying the value of the at least one property to an image, apply the value of the at least one property to the first image using the filter, display the first (Continued)

image, to which the value of the at least one property is applied, through the display, and store the filter in the memory.

14 Claims, 16 Drawing Sheets

(51) Int. Cl.

| | |
|---|---|
| *G06T 5/20* | (2006.01) |
| *G06V 10/46* | (2022.01) |
| *G06V 10/50* | (2022.01) |
| *G06V 10/56* | (2022.01) |
| *G06V 20/00* | (2022.01) |
| *G06V 40/16* | (2022.01) |
| *H04N 23/63* | (2023.01) |
| *H04N 23/80* | (2023.01) |

(52) U.S. Cl.
 CPC ............ *G06V 20/00* (2022.01); *G06V 40/161* (2022.01); *H04N 23/631* (2023.01); *H04N 23/80* (2023.01); *G06F 3/0482* (2013.01); *G06T 2200/24* (2013.01); *G06V 10/467* (2022.01)

(58) Field of Classification Search
 CPC .......... H06T 2207/20092; H06T 11/60; G06V 10/467; G06V 40/161; G06V 20/00; G06V 10/56; G06V 10/507; G06F 3/04847; G06F 3/0482; G06F 3/04845
 See application file for complete search history.

(56) References Cited

U.S. PATENT DOCUMENTS

| | | | | |
|---|---|---|---|---|
| 11,662,898 | B2* | 5/2023 | Kang | ................ G06F 3/04847 348/222.1 |
| 2009/0060369 | A1 | 3/2009 | Agarwala et al. | |
| 2009/0319897 | A1 | 12/2009 | Kotler et al. | |
| 2012/0033888 | A1 | 2/2012 | Takamori | |
| 2013/0107069 | A1 | 5/2013 | Arrasvuori | |
| 2015/0172534 | A1 | 6/2015 | Miyakawa et al. | |
| 2016/0259526 | A1 | 9/2016 | Lee et al. | |
| 2016/0364625 | A1 | 12/2016 | Lin et al. | |
| 2017/0139572 | A1 | 5/2017 | Sunkavalli et al. | |
| 2018/0082715 | A1 | 3/2018 | Rymkowski et al. | |
| 2018/0103213 | A1 | 4/2018 | Holzer et al. | |
| 2019/0369825 | A1 | 12/2019 | Jeong et al. | |
| 2020/0226724 | A1 | 7/2020 | Fang et al. | |

OTHER PUBLICATIONS

Huang et al., Automatic Image Style Transfer Using Emotion-Palette, SPIE, vol. 10806, College of Computer Science and Electronic Engineering, Hunan University, China, Aug. 9, 2018.
Extended European Search Report dated May 24, 2023, issued in European Application No. 21750566.8.
Decision on Grant dated May 9, 2024, issued in Korean Application No. 10-2020-0014431.
International Search report dated May 11, 2021, issued in International Application No. PCT/KR2021/001534.
Written Opinion dated May 11, 2021, issued in International Application No. PCT/KR2021/001534.
OPPO, AI Palettes OPPO Reno 6, https://www.youtube.com/watch?v=IU2whWk8qjM : Jul. 29, 2021.
Oppo, AI Palette: Transfer Photo Styles With OPPO Reno6 Series, https://support.oppo.com/in/answer/?aid=2031691, 2021.
OPPO Find X3 Pro 5G How to: AI Palette, https://www.youtube.com/watch?v=laSPnR9GIPU Mar. 26, 2021.
Samsung, Customize Your Photos With My Filters on Your Galaxy Phone https://www.samsung.com/us/support/answer/ANS00086009/, 2020.
Samsung, Create your own photo filters with My Filters on your Galaxy phone Samsung US, https://youtu.be/liLtZjrWATA, Apr. 2, 2020.
Huawei, Petal Clip overview, https://consumer.huawei.com/en/support/content/en-us15830382/, 2021.
Huawei, How to access Petal Clip, https://consumer.huawei.com/en/support/content/en-us15830334/, 2021.
European Office Action dated Jan. 29, 2025, issued in European Application No. 21 750 566.8.

\* cited by examiner

METHOD FOR PROVIDING FILTER AND ELECTRONIC DEVICE SUPPORTING THE SAME

CROSS-REFERENCE TO RELATED APPLICATION(S)

This application is a Continuation application of prior application Ser. No. 17/168,806, filed on Feb. 5, 2021, which is based on and claims priority under 35 U.S.C. § 119(a) of a Korean patent application number 10-2020-0014431, filed on Feb. 6, 2020, in the Korean Intellectual Property Office, the disclosure of which is incorporated by reference herein in its entirety.

BACKGROUND

1. Field

The disclosure relates to methods for providing a filter and electronic devices supporting the same.

2. Description of Related Art

Electronic devices such as smart phones provide an image editing function. For example, an electronic device allows a user to edit images acquired through a camera or stored in a memory using an image editing program.

Recently, electronic devices have provided a filter function for changing the properties of an image (e.g., an original image). For example, while displaying an image, the electronic device may display images (e.g., thumbnail images) for a plurality of filters individually corresponding to a plurality of properties of the image. When one image is selected by a user from among the images for the plurality of filters, the electronic device may provide an image to which an image property corresponding to the filter of the selected image has been applied.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide the electronic device for providing only filters (or filter functions) generated by the generator (or developer) of the camera application, image application (e.g., Gallery application), or an image editing application (e.g., an application for providing a photo editor tool). Accordingly, filters (e.g., types of filters) that the electronic device may provide to the user may be limited.

Another aspect of the disclosure is to provide methods for providing a filter and electronic devices for supporting the same, which may provide a filter for the user to obtain images having a desired atmosphere, based on the user's input (or selection).

Objects of the disclosure are not limited to the foregoing, and other unmentioned objects would be apparent to one of ordinary skill in the art from the following description.

Additional aspects will be set forth in part in the description which follows and, in part, will be apparent from the description, or may be learned by practice of the presented embodiments.

In accordance with an aspect of the disclosure, an electronic device is provided. The electronic device includes a display, a processor functionally connected with the display, and a memory functionally connected with the processor. The memory stores instructions configured to, when executed, enable the processor to display a first image through the display, display one or more second images through the display while displaying the first image, select a third image from among the one or more second images, identify a value of at least one property of the third image, generate a filter for applying the value of the at least one property to an image, apply the value of the at least one property to the first image using the filter, display the first image, to which the value of the at least one property is applied, through the display, and store the filter in the memory.

In accordance with another aspect of the disclosure, a method is provided. The method includes displaying a first image through a display of an electronic device, displaying one or more second images through the display while displaying the first image, selecting a third image from among the one or more second images, identifying a value of at least one property of the third image, generating a filter for applying the value of the at least one property to an image, applying the value of the at least one property to the first image using the filter, displaying the first image, to which the value of the at least one property is applied, through the display, and storing the filter in a memory of the electronic device.

In accordance with another aspect of the disclosure, an electronic device is provided. The electronic device includes a camera, a display, a processor functionally connected with the camera and the display, and a memory functionally connected with the processor. The memory stores instructions configured to, when executed, enable the processor to display a first image input in real-time using the camera and images indicating one or more filters through the display, display one or more second images through the display, based on a user input for generating a filter while displaying the first image and the images, select a third image from among the one or more second images, identify a value of at least one property of the third image, generate a filter for applying the value of the at least one property to an image, apply the value of the at least one property to the first image using the filter, display the first image, to which the value of the at least one property is applied, through the display, store the filter in the memory, and display an image indicating the filter and the images through the display.

According to various embodiments, the method for providing a filter and the electronic devices for supporting the same may provide a filter for the user to obtain images having a desired atmosphere, based on the user's input (or selection).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
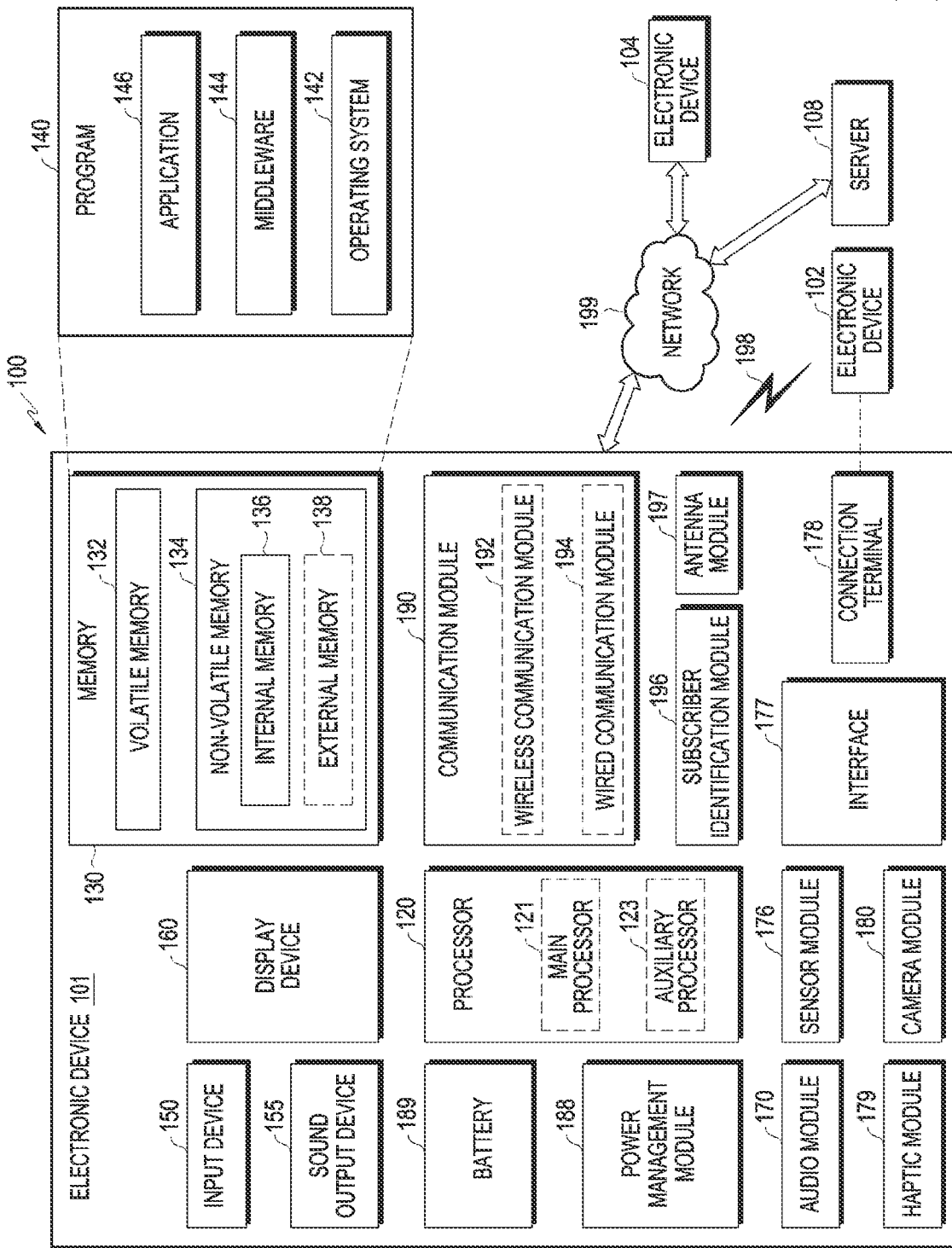
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an electronic device 101 comprises a display (e.g., the display device 160), a processor 120 functionally connected with the display, and a memory 130 functionally connected with the processor 120. The memory 130 stores instructions configured to, when executed, enable the processor 120 to display a first image through the display, display one or more second images through the display while displaying the first image, select a third image from among the one or more second images, identify a value of at least one property of the third image, generate a filter for applying the value of the at least one property to an image, apply the value of the at least one property to the first image using the filter, display the first image, to which the value of the at least one property is applied, through the display, and store the filter in the memory 130.

According to an embodiment of the disclosure, the instructions may be configured to enable the processor 120 to display the one or more second images through the display based on a user input to an object for generating the filter while displaying the first image.

According to an embodiment of the disclosure, the instructions may be configured to enable the processor 120 to identify a value of at least one property of an image portion when the third image may include a blank portion and the image portion.

According to an embodiment of the disclosure, the instructions may be configured to enable the processor 120 to designate a portion of the third image based on a user input, and identify a value of at least one property of the designated portion of the third image.

According to an embodiment of the disclosure, the instructions may be configured to enable the processor 120 to recognize at least one object in the third image, and identify a value of at least one property for an area including the at least one recognized object.

According to an embodiment of the disclosure, the instructions may be configured to enable the processor 120 to display, through the display, a user interface for adjusting a value of a first property among the at least one property after displaying the first image to which the value of the at least one property is applied, adjust the value of the first property based on a user input to the user interface, and generate the filter based on the adjusted value of the first property.

According to an embodiment of the disclosure, the instructions may be configured to enable the processor 120 to display one or more fourth images through the display after displaying the first image to which the value of the at least one property is applied, select at least one fifth image from among the one or more fourth images, and generate the filter based on a value of at least one property of the at least one fifth image.

According to an embodiment of the disclosure, the instructions may be configured to enable the processor 120 to display an image indicating the filter through the display after storing the filter in the memory 130.

According to an embodiment of the disclosure, an electronic device 101 comprises a camera, a display, a processor 120 functionally connected with the camera and the display, and a memory 130 functionally connected with the processor 120. The memory 130 stores instructions configured to, when executed, enable the processor 120 to display a first image input in real-time using the camera and images indicating one or more filters through the display, display one or more second images through the display, based on a user input for generating a filter while displaying the first image and the images, select a third image from among the one or more second images, identify a value of at least one property of the third image, generate a filter for applying the value of the at least one property to an image, apply the value of the at least one property to the first image using the filter, display the first image, to which the value of the at least one property is applied, through the display, store the filter in the memory 130, and display an image indicating the filter and the images through the display.

According to an embodiment of the disclosure, the instructions may be configured to enable the processor 120 to display the third image as the image indicating the filter.

According to an embodiment of the disclosure, the instructions may be configured to enable the processor 120 to display the first image, to which the value of the at least one property is applied, as the image indicating the filter.

According to an embodiment of the disclosure, the at least one property may include at least one of a color tone, brightness, saturation, image complexity, contrast, sharpness, shadow, or color temperature of an image.

Figure 2:
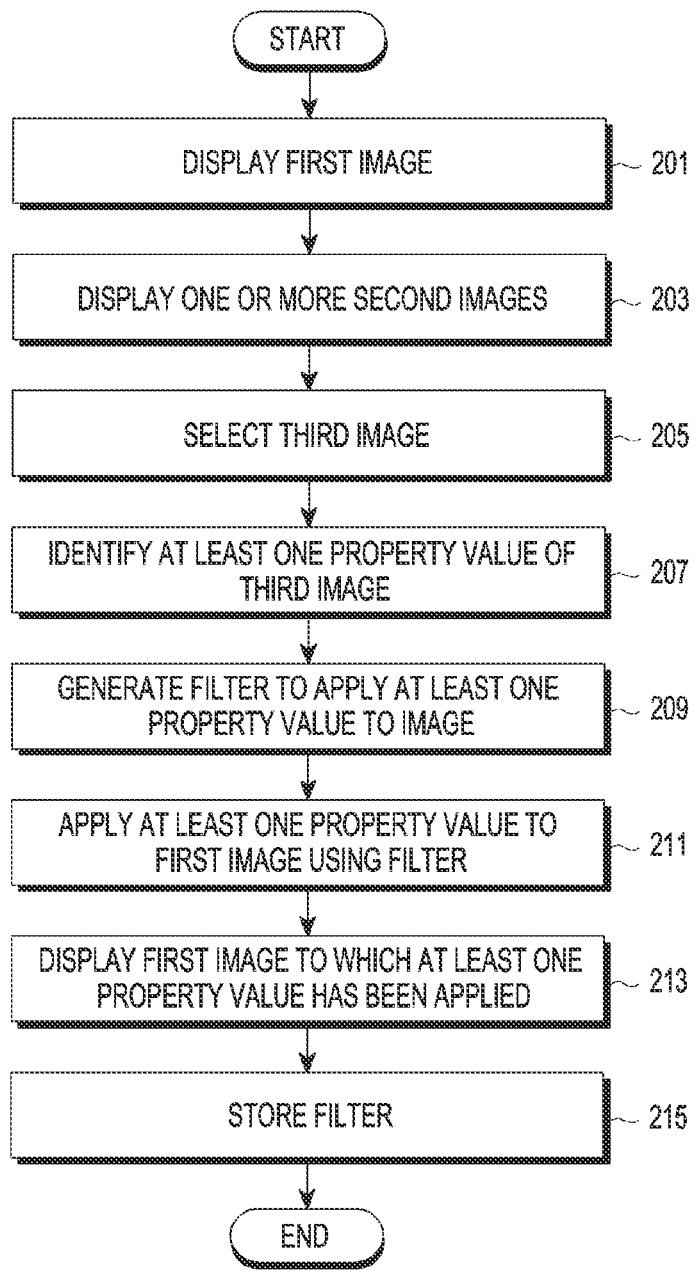
FIG. 2 is a flowchart illustrating a method for providing a filter in an electronic device according to an embodiment of the disclosure.

FIG. 2 is a flowchart illustrating a method for providing a filter in an electronic device according to an embodiment of the disclosure.

Referring to FIG. 2, in operation 201, the processor 120 may display a first image through a display (e.g., the display device 160).

The processor 120 may display the first image through the display using a camera application. For example, when receiving an input for executing the camera application from the user, the processor 120 may display a preview (or live view) image input in real time through the camera, as a first image, through the display. As another example, while displaying the preview image, the processor 120 may display an image captured based on a user input, as the first image, through the display.

The processor 120 may display the first image through the display using an image application (e.g., a Gallery application). For example, the processor 120 may display a plurality of images through the display by executing an image application. The processor 120 may display an image selected from among the plurality of images based on a user input, as a first image, through the display.

However, the method for displaying the first image is not limited to the above-described examples. For example, the processor 120 may display a screen captured based on an input for capturing the screen displayed (e.g., being currently displayed) through the display from the user, as the first image, through the display The processor 120 may display an image (e.g., an image obtained from a webpage or an image registered (or posted) on a social media service server) obtained from the outside (e.g., an external server) using a web application or a social media service application, as the first image, through the display. The processor 120 may display an image received through the communication module 190 from an external electronic device or an image shared with the external electronic device, as the first image, through the display. The processor 120 may receive an image, which is obtained in real-time by an external electronic device (e.g., a camera or wearable device connected for communication with the electronic device) connected for communication with the electronic device, from the external electronic device and display the received image, as the first image, through the display.

The first image may be denoted an original image, target image, or input image to which an image property is to be applied using a filter to be generated.

In operation 203, the processor 120 may display one or more second images through the display.

The processor 120 may display one or more second images through the display, based on a user input for generating a filter (hereinafter, a 'first user input').

The processor 120 may receive an input for generating a filter. For example, upon receiving a user input for editing the first image while displaying the first image, the processor 120 may display, through the display, an object for generating a filter, along with images individually indicating a plurality of pre-stored (or pre-generated) filters (or images individually corresponding to the plurality of filters). The processor 120 may receive a user input for the object for generating a filter, as a first user input.

The processor 120 may display one or more second images, stored in the memory 130 (e.g., a Gallery application), through the display, based on the first user input. For example, the processor 120 may display one or more second images stored in the memory 130, through the display, in a shrunken form (e.g., a thumbnail form), based on the first user input. However, methods for displaying one or more second images are not limited thereto. Hereinafter, one or more images to be displayed through the display based on the first user input are denoted as 'one or more second images.'

Although in the above-described examples, the processor 120 display one or more second images stored in the memory 130 through the display based on the first user input, embodiments of the disclosure are not limited thereto. For example, the processor 120 may obtain one or more second images (e.g., images obtained from a webpage or images registered in a social media service server) through a web application or social media service application based on the first user input and display the one or more obtained second images through the display.

At least some (e.g., at least two) of the one or more second images displayed based on the first user input may be images. However, embodiments of the disclosure are not limited thereto; for example, at least some of the one or more second images displayed based on the first user input may be a videos (or moving images). At least some of the one or more second images displayed based on the first user input may be one frame (or frame image) included in a video (or included in a plurality of frames constituting a video).

In operation 205, the processor 120 may select a third image from among one or more second images.

The processor 120 may receive a user input (hereinafter, referred to as a 'second user input') for selecting the third image from among one or more second images. For example, the processor 120 may receive a touch input for one or more images displayed in a shrunken form (e.g., a thumbnail form) from the user. In an embodiment, the processor 120 may select the third image based on the second user input. Hereinafter, an image selected from one or more second images based on the second user input is referred to as a 'third image.'

In one embodiment of the disclosure, the third image may be an image. However, embodiments of the disclosure are not limited thereto, and in an embodiment, the third image may be a video (or moving image). For example, the third image may be one frame included in a video (or included in a plurality of frames constituting a video).

The third image may be referred to as a reference image that provides a property of the image (or from which a property of the image is to be extracted) to generate a filter.

In operation 207, the processor 120 may identify (or extract) at least one property value of the third image.

At least one property (or at least one property of an image) may include a property that may be identified (or extracted) from the image (or image data). For example, at least one property may include at least one of the color tone (or hue), brightness, saturation (or chroma), image complexity, contrast, sharpness, shadow, or color temperature (or white balance) of the image. The at least one property may include at least a visual effect applied to the image. However, the at least one property is not limited to the above examples, and may include any property related to the image.

The processor 120 may identify at least one property value (e.g., a parameter related to at least one property) for at least a portion of the third image.

The processor 120 may designate a portion of the third image for which at least one property value is to be identified.

The processor 120 may designate (or identify) a portion of the third image for which at least one property value is to be identified, in response to a selection of the third image among one or more second images. For example, in response to the selection of the third image among one or more second images, if the third image includes a blank portion other than the image portion (or image area), the processor 120 may designate the image portion other than the blank portion in the third image as the portion of the third image for which at least one property value is to be identified. In an embodiment, the processor 120 may crop the image portion except for the blank portion from the third image. In response to the selection of the third image among one or more second images, if the third image includes a text (e.g., a text included in the blank portion) other than the image portion, the processor 120 may designate the image portion other than the text-containing portion (or area) in the third image as the portion of the image for which at least one property value is to be identified. In an embodiment, the processor 120 may crop the image portion except for the text-containing portion from the third image.

The processor 120 may designate (or set) an image portion for which at least one property value is to be identified from the third image, based on a user input.

When a portion of the third image is designated from the third image, the processor 120 may identify at least one property value of the designated portion of the third image, based on the designated (or cropped) portion of the third image (or data for the designated portion of the third image).

A method in which the processor 120 designates an image portion for which at least one property value is to be identified from the third image based on a user input and/or in response to a selection of the third image and identifies at least one property value of the designated image portion is described below in detail with reference to FIG. 3.

According to an embodiment of the disclosure, the processor 120 may recognize an object (e.g., a figure or thing) included in the third image from the third image and identify at least one property of the recognized object (e.g., an area including at least a portion of the recognized object). For example, the processor 120 may recognize the object in the third image using a program (or algorithm) capable of recognizing the object in the image. The processor 120 may identify at least one property value of the area including at least a portion of the recognized object. A method for recognizing the object in the third image is described below in detail with reference to FIG. 4.

When the third image is a video, the processor 120 may identify at least one property of one frame of the third image. For example, when the third image is a video including a plurality of frames, the processor 120 may select one frame from among the plurality of frames, based on a user input (e.g., a user input for capturing one frame among the plurality of frames or a user input for temporarily stopping the playing video and then capturing a frame of the stopped video). The processor 120 may identify at least one property of the selected frame.

In operation 209, the processor 120 may generate (or obtain) a filter for applying at least one property value to the image.

The processor 120 may generate a filter for applying at least one property value to the image based on at least one property value of the third image. For example, the processor 120 may generate a filter capable of applying at least one property value of the third image to the first image displayed through operation 201 and/or an image to be obtained after the first image.

The processor 120 may generate a filter for applying at least one property value to the image based on at least one property value of the image portion of the third image.

The processor 120 may generate a filter for applying at least one property value to the image based on at least one property value of the object included in the third image.

The processor 120 may generate a filter configured based on at least one property value of the third image (e.g., at least one property value identified based on data of the third image).

The processor 120 may generate a filter based on at least one property value of the third image and a plurality of designated (e.g., pre-generated) filters. For example, a plurality of different filters generated according to at least one property value related to the image may be stored in the memory 130. The plurality of filters may be generated to differ from one another (or to correspond to at least one property value related to the image) according to at least one property value related to the image, using artificial intelligence on the electronic device 101 or an external electronic device and may be stored in the memory 130. However, methods for generating a plurality of filters are not limited thereto. The processor 120 may identify a filter corresponding to at least one property value of the third image among the plurality of filters stored in the memory 130. The processor 120 may obtain the identified filter as a filter for applying at least one property value to the image.

When a filter is generated, the processor 120 may temporarily store the generated filter in the memory 130. In one embodiment, the processor 120 may store the generated filter in a temporary memory (e.g., the volatile memory 132 or random access memory (RAM)).

In operation 211, the processor 120 may apply at least one property value to the first image using the filter.

For example, the processor 120 may apply at least one property value of the third image to the first image displayed through operation 201 using the filter generated through operation 209.

When the first image is a preview image input in real time through a camera, the processor 120 may apply at least one property value of the third image to the preview image input in real-time, using the generated filter.

When the first image is displayed through an image application, the processor 120 may apply at least one property value of the third image to the first image using the generated filter.

In operation 213, the processor 120 may display the first image, to which at least one property value has been applied, through the display, using the filter.

When the first image is a preview image input in real-time through the camera, the processor 120 may display the preview image, to which at least one property value of the third image has been applied, through the display, using the generated filter.

When the first image is displayed through an image application, the processor 120 may display the first image, to which at least one property value of the third image has been applied, through the display, using the generated filter.

The processor 120 may display the third image, together with the first image to which at least one property value has been applied, through the display. For example, the processor 120 may display, through the display, the third image, together with the first image to which at least one property value has been applied, in a shrunken image form. The processor 120 may overlay and display the third image on the first image, to which at least one property value has been applied, through the display. The processor 120 may display the third image, along with the first image to which at least one property value has been applied, in an area independent (or separate) from the area where the at least one property value-applied first image is displayed, through the display.

After displaying the first image to which at least one property value has been applied, the processor 120 may adjust the values of one or more properties among the at least one property. A method for adjusting the values of one or more of the at least one property by the processor 120 is be described below in detail with reference to FIGS. 5 and 6.

The processor 120 may perform the operation of designating a portion of the third image, to which at least one property value is to be applied, based on a user input, after displaying the first image to which at least one property value has been applied. The processor 120 may perform the operation of generating a filter based on at least one property value of the designated portion of the third image, the operation of applying at least one property value of the designated portion of the third image to the first image using the generated filter, and the operation of displaying, through the display, the first image to which at least one property value of the designated portion of the third image has been applied. The operation of designating a portion of the third image to which at least one property value is to be applied based on the user input after displaying the first image to which at least one property value has been applied through the operation of displaying, through the display, the first image to which at least one property value of the designated portion of the third image has been applied are described below in detail with reference to FIG. 7.

In operation 215, the processor 120 may store the generated filter in the memory 130.

The processor 120 may store the generated filter in the memory 130 based on a user input while displaying the first image to which at least one property value has been applied. For example, the processor 120 may, e.g., semi-permanently, store the generated filter in the memory 130 (e.g., the volatile memory 132), based on a user input for an object for storing the generated filter while displaying the first image to which at least one property value has been applied.

Upon storing the generated filter in the memory 250, the processor 120 may display the image corresponding to the generated filter through the display. For example, upon storing the generated filter in the memory 130, the processor 120 may display an image indicating the generated filter through the display. Upon storing the generated filter in the memory 130, the processor 120 may display, through the display, the generated filter along with images indicating a plurality of pre-stored filters.

The processor 120 may display the image corresponding to the generated filter through the display in various manners. For example, the processor 120 may display the third image, which is the basis of the generated filter, as the image corresponding to the generated filter, through the display. The processor 120 may display, through the display, the image corresponding to the first image to which at least one property value has been applied (e.g., a shrunken image of the first image to which at least one property value has been applied) using the generated filter, as the image corresponding to the generated filter. The processor 120 may display, through the display, an image to which at least one property value has been applied (e.g., any image that does not violate copyright) using the generated filter, as the image corresponding to the generated filter.

The processor 120 may display an image containing text indicating the generated filter and corresponding to the generated filter, through the display. For example, the processor 120 may display, through the display, an image corresponding to the generated filter and containing text indicating the name of the generated filter or text indicating the image property (e.g., at least one property of the third image) which is the basis of the generated filter. However, without limitations thereto, the processor 120 may display, through the display, an image that corresponds to the generated filter and does not include the text indicating the generated filter.

Although not shown in FIG. 2, the processor 120 may store the first image to which at least one property value has been applied in the memory 130. For example, the processor may store the first image to which at least one property value has been applied in the memory 130 based on a user input.

Although not shown in FIG. 2, after the newly generated filter is stored, and when a filter function is executed on the image displayed using an image application or a newly obtained image using a camera application, the processor may display the filter, newly generated and stored, through the display. For example, after the newly generated filter is stored, and when a filter function is executed on the image displayed using an image application or a newly obtained image using a camera application, the processor may display, through the display, the filter, newly generated and stored, as a pre-stored filter (e.g., along with filters pre-stored before newly generating the filter).

Figure 3:
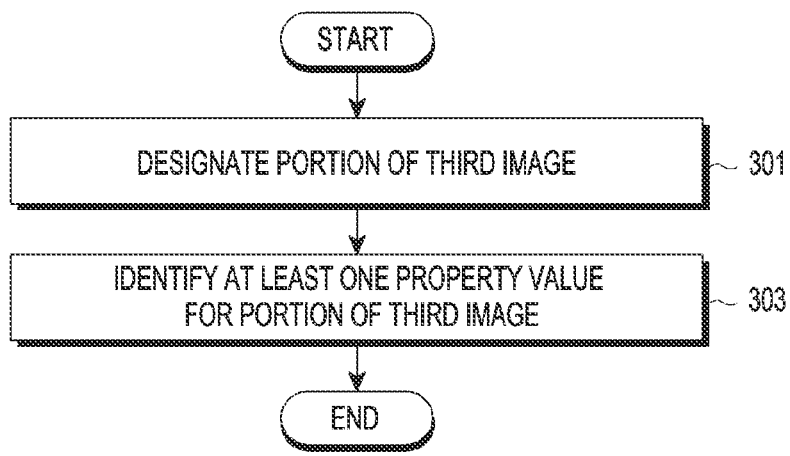
FIG. 3 is a flowchart illustrating a method for identifying at least one property value of a third image, according to an embodiment of the disclosure.

FIG. 3 is a flowchart illustrating a method for identifying at least one property value of a third image, according to an embodiment of the disclosure.

Referring to FIG. 3, in operation 301, according to an embodiment, the processor 120 may designate a portion of the third image.

The processor 120 may identify an image portion in the third image, in response to a user input for selecting the third image among one or more second images.

The processor 120 may designate (or identify) a portion of the third image for which at least one property value is to be identified, in response to a selection of the third image among one or more second images.

In response to the selection of the third image among one or more second images, if the third image includes a blank portion other than the image portion (or image area), the processor 120 may designate the image portion other than the blank portion in the third image as the portion of the third image for which at least one property value is to be identified. For example, when the third image includes a blank portion in addition to the image portion (or image area), the processor 120 may identify (or detect) an edge (or outline) of the image portion in the third image. The processor 120 may designate (or identify) the image portion, other than the blank portion in the third image, as a portion for which at least one property is to be identified (or extracted) based on the identified edge of the image portion. The processor 120 may crop the designated portion (e.g., the image portion) from the third image. Although in the above example, a portion of the third image is designated by identifying an edge of the image portion in the third image, embodiments of the disclosure are not limited thereto. For example, other various methods may be adopted for designating the image portion, for which at least one property is to be identified, in the third image.

In response to the selection of the third image among one or more second images, if the third image includes a text (e.g., a text included in the blank portion) other than the image portion (or image area), the processor 120 may designate the portion (e.g., the image portion) other than the text-containing portion in the third image as the portion of the image for which at least one property value is to be identified. The processor 120 may crop the designated portion (e.g., the image portion), except for the text-containing portion, from the third image.

When the third image includes a blank portion or text other than the image portion (or image area), the processor 120 may automatically designate only the image portion, except for the blank portion or text in the third image, as the portion of the third image, for which at least one property value is to be identified, thereby generating a filter based only on the image portion in the third image.

The processor 120 may designate, set, or select the portion of the third image, for which at least one property value is to be identified, from the third image based on a user input.

When the third image is selected from among one or more second images, the processor 120 may display, through the display (e.g., the display device 160), an object (or image object) (hereinafter, a 'first object') for designating the portion for which at least one property value is to be identified by a user input in the third image, along with the selected third image. The processor 120 may identify the portion of the third image designated (or set) by the position of the first object, based on a user input to the first object (e.g., a drag input to move the first object). The processor 120 may crop the identified portion of the third image. However, methods for designating the image portion for which at least one property value is to be identified from the third image based on a user input are not limited thereto.

The processor 120 may generate a filter based on the user's desired portion in the third image by designating the portion for which at least one property value is to be identified from the third image based on a user input. The processor 120 may generate a filter based on the image portion, except for the blank portion or text in the third image, by designating the portion for which at least one property value is to be identified from the third image based on a user input.

The operation of designating the portion for which at least one property value is to be identified from the third image based on a user input may be performed after performing the operation of designating (or identifying) the portion of the third image, for which at least one property value is to be identified, in response to the selection of the third image from among the one or more second images. For example, the processor 120 may designate a portion of the third image, for which at least one property value is to be display, in response to the selection of the third image from among the one or more second images and crop the designated portion of the third image. The processor 120 may display the cropped portion of the third image through the display. The processor 120 may redesignate a portion for which at least one property value is to be identified in the displayed portion of the third image, based on a user input to the displayed portion of the third image. However, without limitations thereto, the operation of designating the portion for which at least one property value is to be identified from the third image based on a user input may be performed before performing the operation of designating (or identifying) the portion of the third image, for which at least one property value is to be identified, in response to the selection of the third image from among the one or more second images.

In operation 303, the processor 120 may identify at least one property value for the designated portion of the third image.

When a portion of the third image is designated from the third image, the processor 120 may identify at least one property value (or parameter related to at least one property) of the designated portion of the third image, based on the designated (or cropped) portion of the third image (or data for the designated portion of the third image). For example, the processor 120 may identify the value of at least one property of the designated portion of the third image (e.g., at least one of the color tone (or hue), brightness, saturation, image complexity, contrast, sharpness, shadow, or color temperature (or white balance) of the image or a visual effect). However, at least one property identified by the processor is not limited to the above examples.

Figure 4:
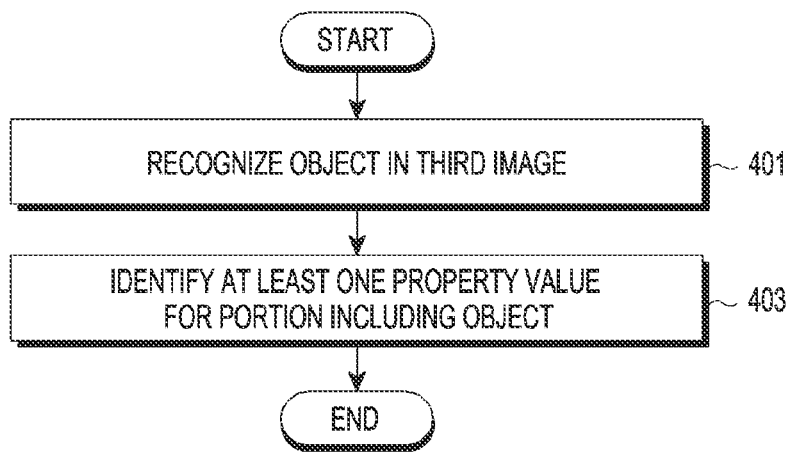
FIG. 4 is a flowchart illustrating a method for identifying at least one property value by recognizing an object recognized in a third image, according to an embodiment of the disclosure.

FIG. 4 is a flowchart illustrating a method for identifying at least one property value by recognizing an object recognized in a third image, according to an embodiment of the disclosure.

Referring to FIG. 4, in operation 401, according to an embodiment, the processor 120 may recognize an object (e.g., a figure object or thing object) in the third image. For example, the processor 120 may recognize the object in the third image using a program (or algorithm) capable of recognizing the object in the image.

The processor 120 may recognize the object in the third image in response to selection of the third image from among one or more second images. The processor 120 may recognize the object in the third image based on a user input (e.g., a touch input to a user interface (e.g., an icon) matched with a function for performing object recognition) while displaying the third image.

The processor 120 may recognize at least one object in the third image. The processor 120 may display, through the display (e.g., the display device 160), an indication that at least one object recognized in the third image is recognized. When a plurality of objects are recognized in the third image, the processor 120 may display, through the display, an indicating that each of the plurality of recognized objects is recognized, for each of the plurality of objects. For example, when the plurality of objects are recognized in the third image, the processor 120 may display the outline of each of the plurality of objects for each of the plurality of objects, through the display. However, methods for displaying an indication that each of the plurality of recognized objects is recognized are not limited thereto.

When an object is recognized in the third image, the processor 120 may select the recognized object. When a plurality of objects are recognized in the third image, the processor 120 may select at least one object from among the plurality of objects based on a user input. For example, the processor 120 may select at least one object, to which the user's touch input has been made, from among the plurality of objects. However, methods for selecting an object recognized in the third image are not limited thereto.

In operation 403, The processor 120 may identify at least one property value for the portion including the object in the third image.

The processor 120 may identify at least one property value of the portion including the recognized object (e.g., the portion corresponding to the recognized object) in the third image. For example, the processor 120 may identify the value of at least one property of the portion including the recognized object (e.g., at least one of the color tone (or hue), brightness, saturation, image complexity, contrast, sharpness, shadow, or color temperature (or white balance) of the image or a visual effect).

Figure 5:
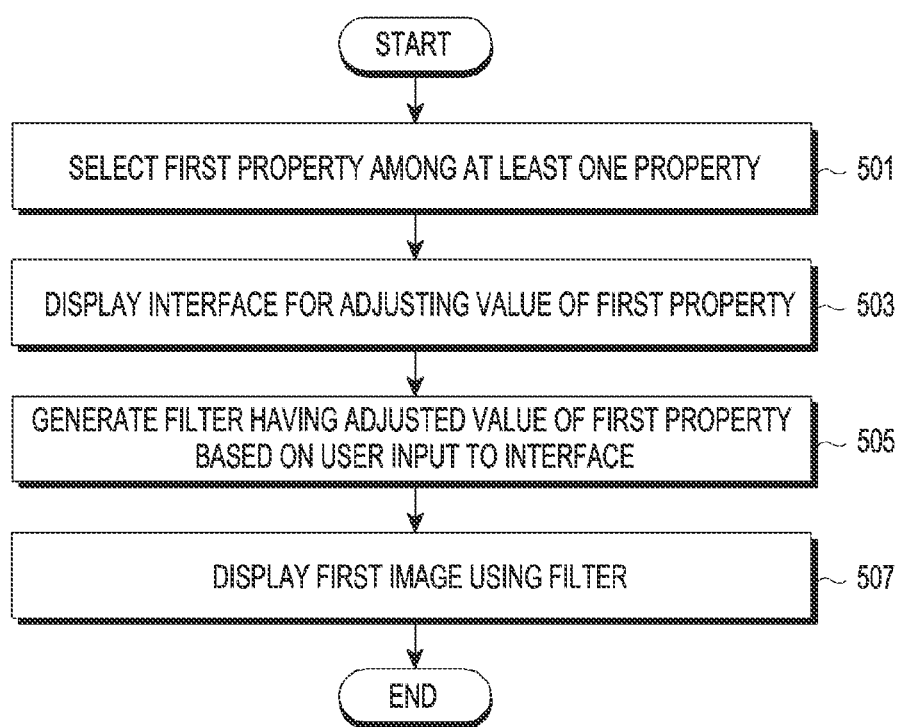
FIG. 5 is a flowchart illustrating a method for adjusting at least one property value based on a user interface, according to an embodiment of the disclosure.

FIG. 5 is a flowchart illustrating a method for adjusting at least one property value based on a user interface, according to an embodiment of the disclosure.

The operations shown in FIG. 5 may be included in the operation of displaying the first image to which at least one property value has been applied, as in operation 213 of FIG. 2, or may be operations performed after the performing the operation of displaying the first image to which at least one property value has been applied.

Referring to FIG. 5, in operation 501, the processor 120 may select a first property from among at least one property.

While displaying the first image to which at least one property value has been applied, the processor 120 may select a property to be adjusted (hereinafter, a 'first property') from among at least one property, based on a user input. For example, upon receiving a user input for the third image while displaying the third image along with the first image to which at least one property value has been applied, the processor 120 may display, through the display (e.g., the display device 160), at least one object corresponding to at least one property (or indicating at least one property). The processor 120 may select the first property corresponding to the user input-received object from among at least one object corresponding to at least one property.

In operation 503, the processor 120 may display an interface for adjusting the value of the selected first property, through the display.

When the first property is selected, the processor 120 may display the interface for adjusting the value of the selected first property through the display.

To adjust the value of the first property, the processor 120 may display an interface including bar indicating the range of the first property value and an object, which may move according to the bar, through the display. The positions of the object on the bar may individually correspond to the values of the first property. To adjust the value of the first property, the processor 120 may display an interface including the field for inputting the value of the first property through the display. However, methods for displaying the interface for adjusting the value of the selected first property are not limited thereto.

In operation 505, the processor 120 may generate a filter having an adjusted value of the first property (e.g., for which the adjusted value of the first property may be applied to the image), based on a user input to the interface.

The processor 120 may adjust the value of the first property based on a user input to the interface. For example, the processor 120 may adjust the value of the first property by moving the position of the object for adjusting the value of the first property according to the bar indicating the range of the value of the first property, based on a user input (e.g., a drag input to the object for adjusting the value of the first property). As another example, the processor 120 may adjust the value of the first property by inputting the value of the first property to the field for inputting the value of the first property based on a user input.

The processor 120 may generate a filter based on at least one property value including the adjusted value of the first property. For example, when at least one property which is the basis of a filter to be generated includes a first property and a second property and, of the values of the first property and the second property, the value of the first property is adjusted, the processor 120 may generate a filter for applying the adjusted value of the first property and the non-adjusted value of the second property to the image.

In operation 507, the processor 120 may display, through the display, the first image using a filter generated based on at least one property value including the adjusted value of the first property.

Since the operation of displaying the first image using a filter generated based on at least one property value including the adjusted value of the first property as described above in connection with operation 507 is at least partially the same or similar to the operation of displaying the first image to which at least one property value has been applied using a filter as described above in connection with operation 213 of FIG. 2, no duplicate description is given below.

When the first image is a preview image input in real-time through the camera, the processor 120 may display the preview image, to which at least one property value including the adjusted value of the first property of the third image has been applied, through the display, using the generated filter.

When the first image is displayed through an image application, the processor 120 may display the first image, to which at least one property value including the adjusted value of the first property of the third image has been applied, through the display, using the generated filter.

The processor 120 may display the third image, together with the first image to which at least one property value including the adjusted value of the first property has been applied, through the display.

The processor 120 may display the third image in which the value of the first property has been adjusted, together with the first image to which at least one property value including the adjusted value of the first property has been applied, through the display.

Figure 6:
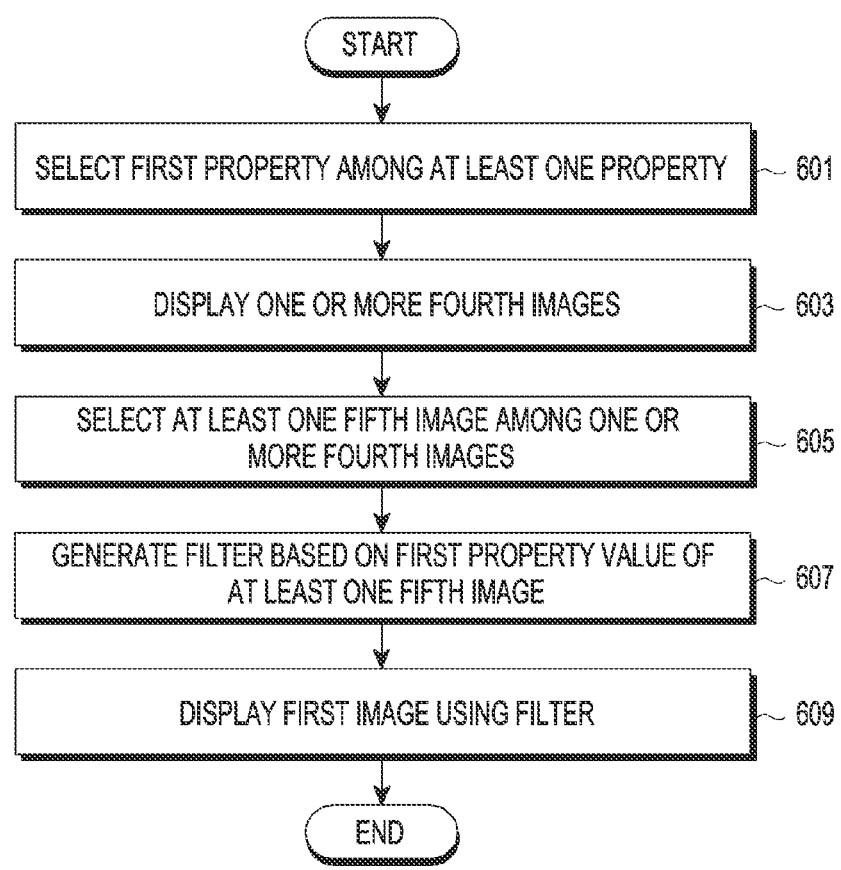
FIG. 6 is a flowchart illustrating a method for adjusting at least one property value based on a plurality of images, according to an embodiment of the disclosure.

FIG. 6 is a flowchart illustrating a method for adjusting at least one property value based on a plurality of images, according to an embodiment of the disclosure.

Referring to FIG. 6, the operations illustrated in FIG. 6 may be included in the operation of displaying the first image to which at least one property value has been applied, as in operation 213 of FIG. 2, or may be operations performed after the performing the operation of displaying the first image to which at least one property value has been applied.

Referring to FIG. 6, in operation 601, the processor 120 may select a first property from among at least one property.

Since the operation of selecting the first property among at least one property by the processor 120 as in operation 601 is at least partially the same or similar to the operation of selecting the first property from among at least one property by the processor 120 as in operation 501 of FIG. 4, no repetitive description thereof is given below.

In operation 603, the processor 120 may display one or more fourth images through the display (e.g., the display device 160).

In response to selection of the first property, the processor 120 may display one or more fourth images related to the first property stored in the memory 130 through the display.

When the processor 120 selects the first property from among at least one property, the processor 120 may display one or more fourth images, which have the value of the first property in a designated range from the value of the first property of the third image among one or more second images stored in the memory 130, through the display. For example, when the processor 120 selects color tone (or hue) as the first property, the processor 120 may identify one or more fourth images having a color tone value in a designated range from the first value of the color tone of the third image among one or more second images stored in the memory 130 (hereinafter denoted as 'one or more fourth images'). The processor 120 may display the one or more identified fourth images through the display.

When selecting the first property from among at least one property, the processor 120 may display one or more second images stored in the memory 130 through the display. The processor 120 may control the display to separately display one or more fourth images having the value of the first property, which belongs to a designated range from the value of the first property of the third image, among one or more second images and images having the value of the first property, which does not belong to the designated range from the value of the first property of the third image. For example, the processor 120 may control the display so that, among one or more second images, the one or more fourth images differ in shade from the images having the value of the first property which does not belong to the designated range from the value of the first property of the third image. However, methods for controlling the display to separately display one or more fourth images and the images having the value of the first property which does not belong to the designated range from the value of the first property of the third image among the one or more second images are not limited thereto. For example, the processor may display, through the display, only one or more fourth images which have a value belonging to the designated range from the value of the first property of the third image among one or more second images.

The processor 120 may enable selection to be possible for one or more fourth images among one or more second images and not to be possible for the images having the value of the first property which does not belong to the designated range from the value of the first property of the third image. The processor 120 may enable inclusion of an object indicating that one or more fourth images are selectable among one or more second images, and exclusion of an object indicating that the images having the value of the first property which does not belong to the designated range from the value of the first property of the third image are selectable.

The processor 120 may enable selection to be rendered possible for one or more fourth images among one or more second images and not to be rendered possible for the images having the value of the first property which does not belong to the designated range from the value of the first property of the third image, thereby allowing the user to easily select at least some of one or more fourth images having the value of the first property, which are similar to the value of the first property of the third image (e.g., which fall within the designated range from the value of the first property of the third image). According to an embodiment, the one or more fourth images may include the third image.

In operation 605, the processor 120 may select at least one fifth image from among one or more fourth images. For example, the processor 120 may select at least one fifth image from among the one or more fourth images based on a user input (e.g., a touch input to at least one fifth image among the one or more fourth images).

The processor 120 may select at least one fifth image, including the third image, from among one or more fourth images. The processor 120 may select at least one fifth image, which does not include the third image, from among one or more fourth images. For example, in operation 603, upon displaying one or more fourth images, the third image may be in the state of being selected as default. The processor 120 may deselect the third image based on a user input and may select at least one image, except for the third image, as at least one fifth image, from among one or more fourth images.

In operation 607, the processor 120 may generate a filter based on the value of the first property of at least one fifth image. For example, the processor 120 may identify the value of the first property of at least one fifth image. The processor 120 may determine (or calculate) the value of the first property which results from averaging the value of the first property of at least one fifth image. The processor 120 may generate a filter based on at least one property value including the determined (or calculated) value of the first property. Although in the above-described example, a filter is generated using the average of the value of the first property of at least one fifth image, embodiments of the disclosure are not limited thereto.

In operation 609, the processor 120 may display, through the display, the first image using the filter generated based on the first property value of at least one fifth image.

Since the operation of displaying the first image using a filter generated based on at least one property value of at least one fifth image as in operation 609 is at least partially the same or similar to the operation of displaying the first image using a filter generated based on at least one property value including the adjusted value of the first property as in operation 507 of FIG. 5, no duplicate description is given below.

Although FIG. 6 illustrates an example operation for displaying one or more fourth images related to the first property, embodiments of the disclosure are not limited thereto. For example, the processor 120 may display, through the display, one or more second images stored in the memory 130 in response to selection of the first property in operation 601. The processor 120 may select at least one fifth image from among one or more displayed second images based on a user input and generate a filter based on the first property value of at least one fifth image selected.

Figure 7:
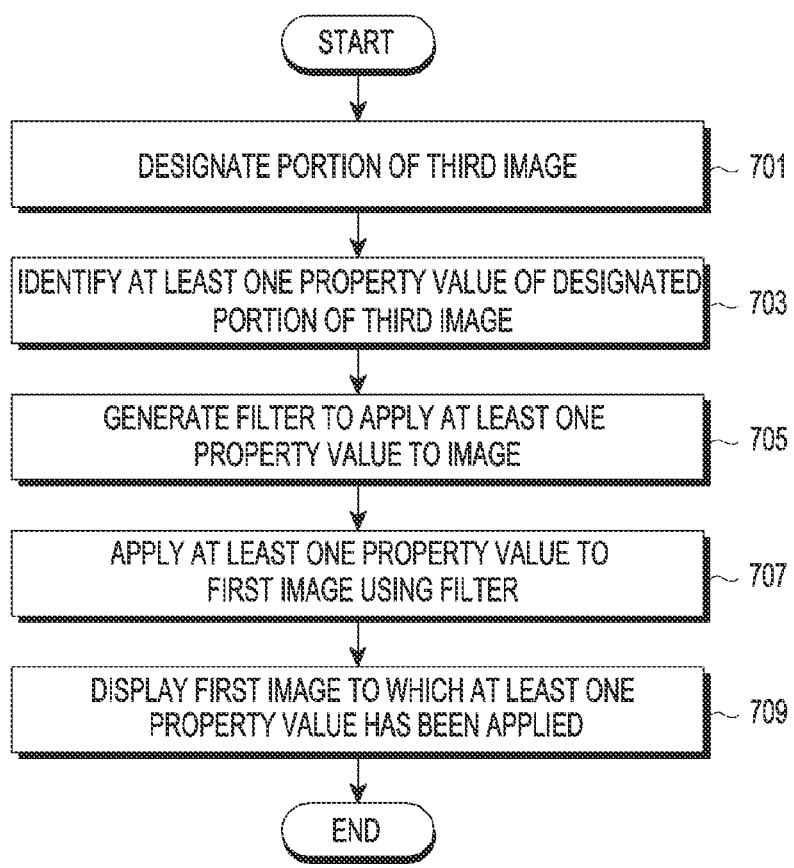
FIG. 7 is a flowchart illustrating a method for generating a filter based on a portion of a third image designated based on a user input, according to an embodiment of the disclosure.

FIG. 7 is a flowchart illustrating a method for generating a filter based on a portion of a third image designated based on a user input, according to an embodiment of the disclosure.

Referring to FIG. 7, the operations illustrated in FIG. 7 may be included in the operation of displaying the first image to which at least one property value has been applied, as in operation 213 of FIG. 2, or may be operations performed after the performing the operation of displaying the first image to which at least one property value has been applied.

Referring to FIG. 7, in operation 701, the processor 120 may designate a portion of the third image based on a user input.

The processor 120 may display, through the display (e.g., the display device 160), a first object for designating a portion for which at least one property value is to be identified by a user input in the third image while displaying the third image along with the first image to which at least one property value has been applied. For example, the processor 120 may display, through the display, an enlarged third image and a first object in the enlarged third image, based on a user input for selecting the third image while displaying the third image along with the first image to which at least one property value has been applied. The processor 120 may identify the portion of the third image designated (or set) by the position of the first object, based on a user input to the first object (e.g., a drag input to move the first object). The processor 120 may crop the identified portion of the third image. However, methods for designating the image portion for which at least one property value is to be identified from the third image based on a user input are not limited thereto.

The processor 120 may generate a filter based on the user's desired portion in the third image by designating the portion for which at least one property value is to be identified from the third image based on a user input even after displaying the first image to which at least one property value has been applied.

In operation 703, the processor 120 may identify at least one property value for the designated portion of the third image.

In operation 705, the processor 120 may generate (or obtain) a filter for applying at least one property value to the image.

In operation 707, the processor 120 may apply at least one property value to the first image using the filter.

In operation 709, the processor 120 may display the first image, to which at least one property value has been applied, through the display, using the filter.

Since the embodiments of operations 703 to 709 are at least partially the same or similar to the embodiments of operations 207 to 213 of FIG. 2, no detailed description thereof is presented below.

Figure 8:
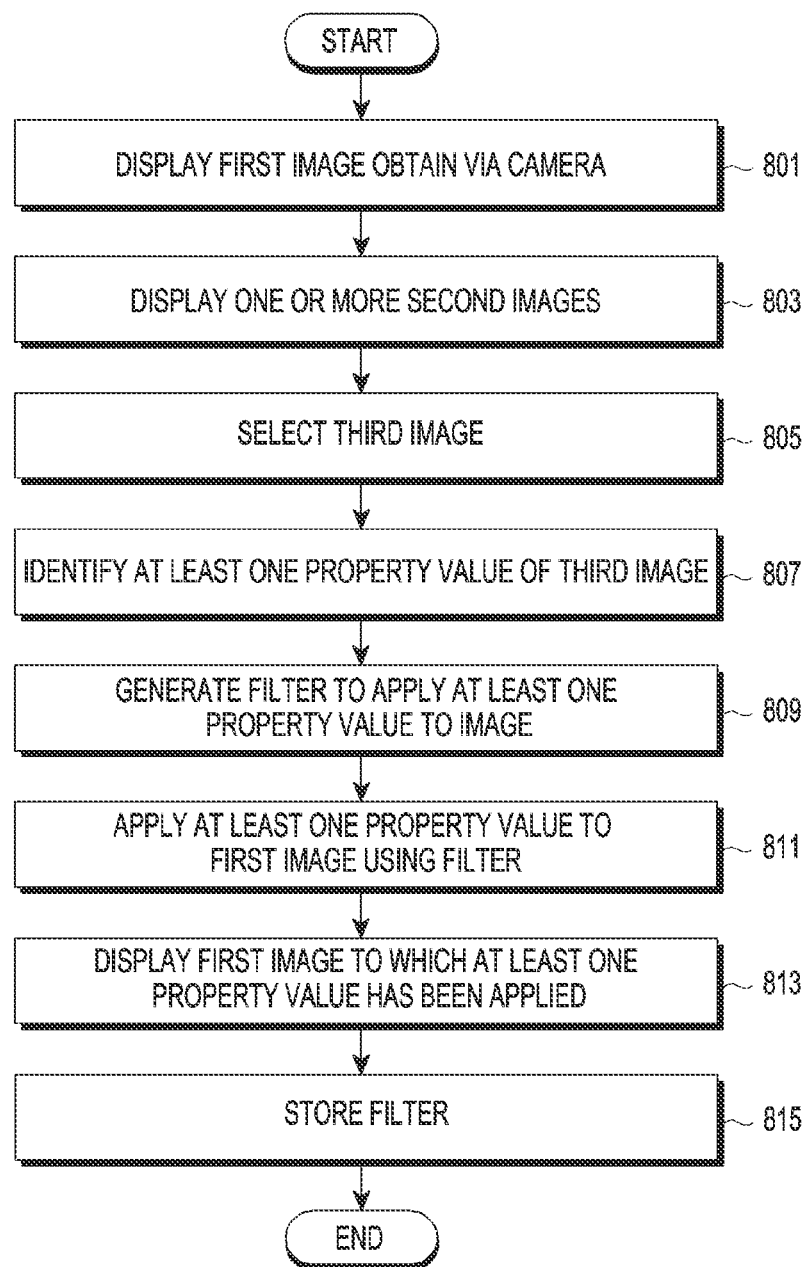
FIG. 8 is a flowchart illustrating a method for providing a filter using a camera application according to an embodiment of the disclosure.

FIG. 8 is a flowchart illustrating a method for providing a filter using a camera application according to an embodiment of the disclosure.

Referring to FIG. 8, in operation 801, the processor 120 may display a first image obtained through a camera through a display (e.g., the display device 160). For example, when receiving an input for executing the camera application from the user, the processor 120 may display a preview image input in real time through the camera, as a first image, through the display.

In operation 803, the processor 120 may display one or more second images through the display.

The processor 120 may receive a user input for displaying a filter for applying (or changing) at least one property to the first image while displaying the first image.

The processor 120 may display, through the display, an object for newly generating a filter along with images individually indicating (or corresponding to) a plurality of pre-stored filters based on a user input for displaying the filter for applying (or changing) at least one property to the first image.

The plurality of pre-stored filters may include at least one filter generated by the generator (or developer) of the camera application (hereinafter, 'at least one first filter') and at least one filter generated and stored by the user of the electronic device 101 (e.g., the filter stored through operation 215 of FIG. 2) (hereinafter, 'at least one second filter'). However, the at least one first filter is not limited to filters generated by the generator (or developer) of the camera application but may rather include filters which have been downloaded by the electronic device after generated by a third party (or an external device).

The processor 120 may display at least one first filter through the display, based on a user input while displaying the first image. For example, the processor 120 may display, through the display, a shrunken image (e.g., image displayed in the form of a thumbnail) of the image where the property corresponding to each of at least one first filter has been applied to the first image.

The processor 120 may display, through the display, the object for generating a filter and at least one second filter based on a user input while displaying at least one first filter. For example, the processor 120 may display, through the display, the object for generating a filter along with a shrunken image of the third image (e.g., an image for which at least one property to be applied to the image has been identified (or extracted) upon generating at least one second filter) used to generate at least one second filter based on a user input while displaying at least one first filter.

Each of the images indicating the plurality of pre-stored filters may include text indicating the name of the filter or text indicating (or corresponding to) the image property (or the property value of the image) (e.g., at least one property of the third image) which is the basis of the filter.

However, methods for displaying the pre-stored filters by the processor 120 and methods for displaying the object for generating a filter are not limited thereto.

The processor 120 may display, through the display, one or more second images stored in the memory 130, based on a user input to the object for generating a filter (e.g., a touch input to the object for generating a filter). For example, the processor 120 may display, through the display, one or more second images stored in the memory 130 and related to an image application or camera application, based on a user input to the object for generating a filter.

The processor 120 may display the second images in a shrunken form (e.g., a thumbnail form) through the display.

In operation 805, the processor 120 may select a third image from among one or more second images.

In operation 807, the processor 120 may identify (or extract) at least one property value of the third image.

In operation 809, the processor 120 may generate (or obtain) a filter for applying at least one property value to the image.

Since the embodiments of operations 805 to 809 are at least partially the same or similar to the embodiments of operations 205 to 209 of FIG. 2, no detailed description thereof is presented below.

In operation 811, The processor 120 may apply at least one property value to the first image using the filter (e.g., the filter generated through operation 809). The processor 120 may apply the at least one property value of the third image to the preview image input in real-time as the first image.

In operation 813, The processor 120 may display the first image, to which at least one property value has been applied, through the display, using the filter.

The processor 120 may continuously display, through the display, the preview image to which at least one property value of the third image has been applied, for the preview image input in real-time as the first image.

The processor 120 may display the third image, together with the first image to which at least one property value has been applied, through the display. For example, the processor 120 may display, through the display, the third image, together with the first image to which at least one property value has been applied, in a shrunken image form. The processor 120 may overlay and display the third image on the first image, to which at least one property value has been applied, through the display. The processor 120 may display the third image, along with the first image to which at least one property value has been applied, in an area independent (or separate) from the area where the at least one property value-applied first image is displayed, through the display.

In operation 815, according to an embodiment, the processor 120 may store the generated filter in the memory 130. The processor 120 may store the generated filter in the memory 130 based on a user input while displaying the first image to which at least one property value has been applied. For example, the processor 120 may store the generated filter in the memory 130, based on a user input for an object for storing the generated filter while displaying the first image to which at least one property value has been applied.

Upon storing the generated filter in the memory 250, the processor 120 may display the image corresponding to the generated filter through the display. For example, upon storing the generated filter in the memory 130, the processor 120 may display an image indicating the generated filter through the display. As another example, upon storing the generated filter in the memory 130, the processor 120 may display, through the display, the generated filter along with the image indicating at least one second filter which has been displayed in operation 801.

The processor 120 may display, through the display, a shrunken image of the third image (or a thumbnail image of the third image), as the image indicating the generated filter. However, embodiments of the disclosure are not limited thereto.

The processor 120 may display an image containing text indicating the generated filter and corresponding to the generated filter, through the display. For example, the processor 120 may display, through the display, an image corresponding to the generated filter and containing text indicating the name of the generated filter or text indicating the image property (e.g., at least one property of the third image) which is the basis of the generated filter.

Although not shown in FIG. 8, the examples described above in connection with FIGS. 3 to 7 may apply likewise to the examples of the operations of FIG. 8.

Figure 9:
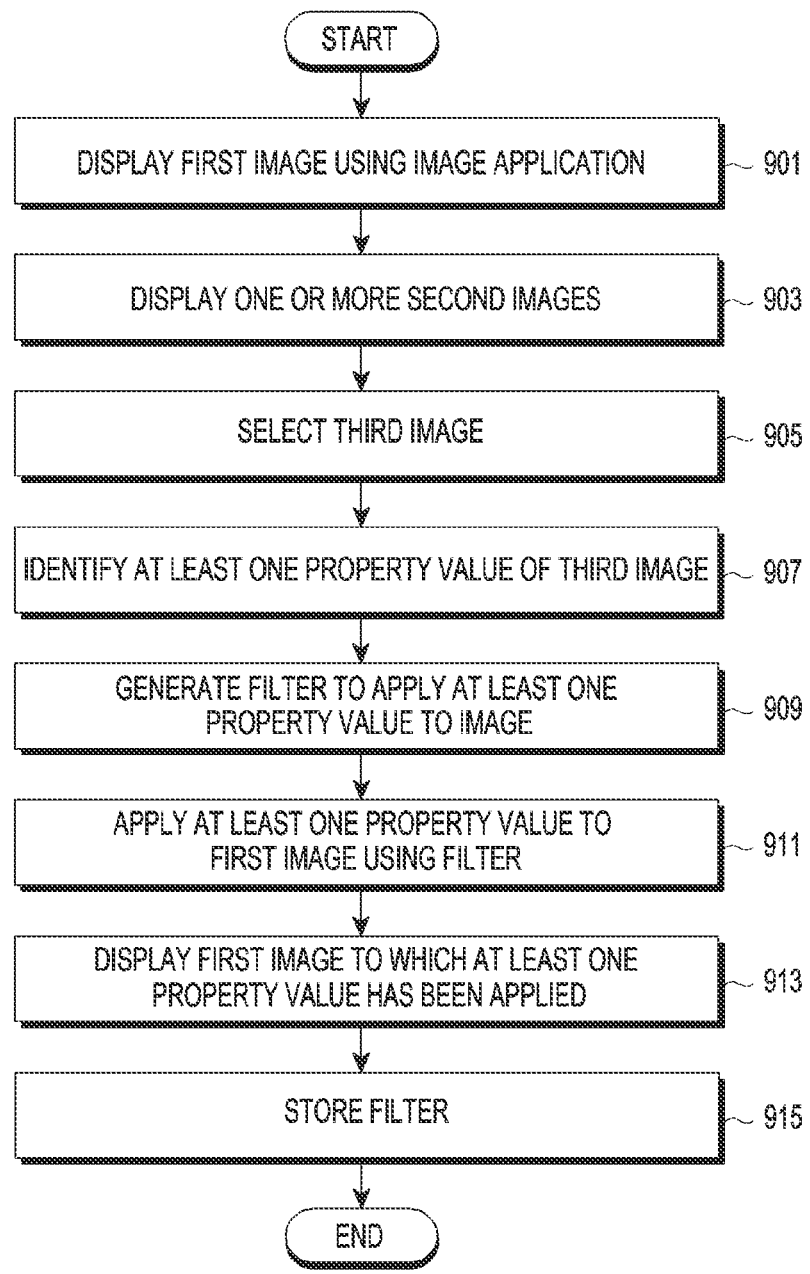
FIG. 9 is a flowchart illustrating a method for providing a filter using an image application according to an embodiment of the disclosure.

FIG. 9 is a flowchart illustrating a method for providing a filter using an image application according to an embodiment of the disclosure.

Referring to FIG. 9, in operation 901, the processor 120 may display a first image through a display (e.g., the display device 160) using an image application (e.g., a Gallery application). For example, the processor 120 may display a plurality of images through the display by executing an image application. The processor 120 may display an image selected from among the plurality of images based on a user input, as a first image, through the display.

In operation 903, the processor 120 may display one or more second images through the display.

The processor 120 may receive a user input for displaying a filter for applying (or changing) at least one property to the first image while displaying the first image.

The processor 120 may display, through the display, an object for newly generating a filter along with images individually indicating (or corresponding to) a plurality of pre-stored filters based on a user input for displaying the filter for applying (or changing) at least one property to the first image.

The plurality of pre-stored filters may include at least one filter generated by the generator (or developer) of the camera application (hereinafter, 'at least one first filter') and at least one filter generated and stored by the user of the electronic device 101 (e.g., the filter stored through operation 215 of FIG. 2) (hereinafter, 'at least one second filter').

The processor 120 may display, through the display, at least one first filter, at least one second filter, and an object for generating a filter, based on a user input while displaying the first image. For example, the processor 120 may display, through the display, a shrunken image of the image for which the property corresponding to each of at least one first filter has been applied to the first image (e.g., an image displayed in the form of a thumbnail), a shrunken image of the third image used to generate at least one second filter (e.g., an image for which at least one property to be applied to the image has been identified), and an object for generating a filter.

Each of the images indicating the plurality of pre-stored filters may include text indicating the name of the filter or text indicating the image property (or the property value of the image) (e.g., at least one property of the third image) which is the basis of the filter.

However, methods for displaying the pre-stored filters by the processor 120 and methods for displaying the object for generating a filter are not limited thereto.

The processor 120 may display, through the display, one or more second images stored in the memory 130, based on a user input to the object for generating a filter (e.g., a touch input to the object for generating a filter). For example, the processor 120 may display, through the display, one or more second images stored in the memory 130 and related to an image application or camera application, based on a user input to the object for generating a filter.

The processor 120 may display the second images in a shrunken form (e.g., a thumbnail form) through the display.

In operation 905, the processor 120 may select a third image from among one or more second images.

In operation 907, the processor 120 may identify (or extract) at least one property value of the third image.

In operation 909, the processor 120 may generate (or obtain) a filter for applying at least one property value to the image.

In operation 911, the processor 120 may apply at least one property value to the first image using the filter (e.g., the filter generated through operation 909).

In operation 913, the processor 120 may display the first image, to which at least one property value has been applied, through the display, using the filter.

Since the embodiments of operations 905 to 913 are at least partially the same or similar to the embodiments of operations 205 to 213 of FIG. 2, no detailed description thereof is presented below.

In operation 915, according to an embodiment, the processor 120 may store the generated filter in the memory 130. The processor 120 may store the generated filter in the memory 130 based on a user input while displaying the first image to which at least one property value has been applied. For example, the processor 120 may store the generated filter in the memory 130, based on a user input for an object for storing the generated filter while displaying the first image to which at least one property value has been applied.

Upon storing the generated filter in the memory 250, the processor 120 may display the image corresponding to the generated filter through the display. For example, upon storing the generated filter in the memory 130, the processor 120 may display an image indicating the generated filter through the display. As another example, upon storing the generated filter in the memory 130, the processor 120 may display, through the display, the generated filter along with images indicating pre-designated filters which have been displayed in operation 901.

The processor 120 may display, through the display, a shrunken image of the first image, for which at least one property value has been applied, (or a thumbnail image of the first image), as the image indicating the generated filter. However, embodiments of the disclosure are not limited thereto.

The processor 120 may display an image containing text indicating the generated filter and corresponding to the generated filter, through the display. For example, the processor 120 may display, through the display, an image corresponding to the generated filter and containing text indicating the name of the generated filter or text indicating the image property (e.g., at least one property of the third image) which is the basis of the generated filter.

Although not shown in FIG. 9, the examples described above in connection with FIGS. 3 to 7 may apply likewise to the examples of the operations of FIG. 9.

Figure 10A:
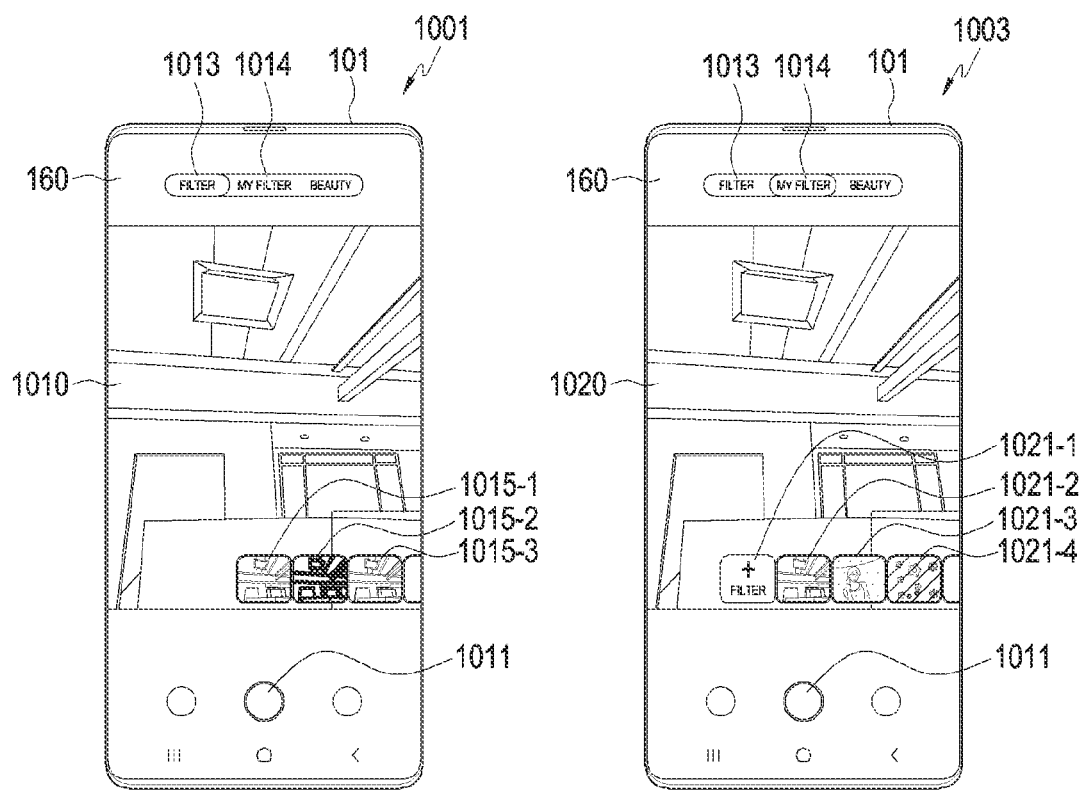
FIGS. 10A and 10B are views illustrating a method for providing a filter using a camera application according to various embodiments of the disclosure.
Figure 10B:
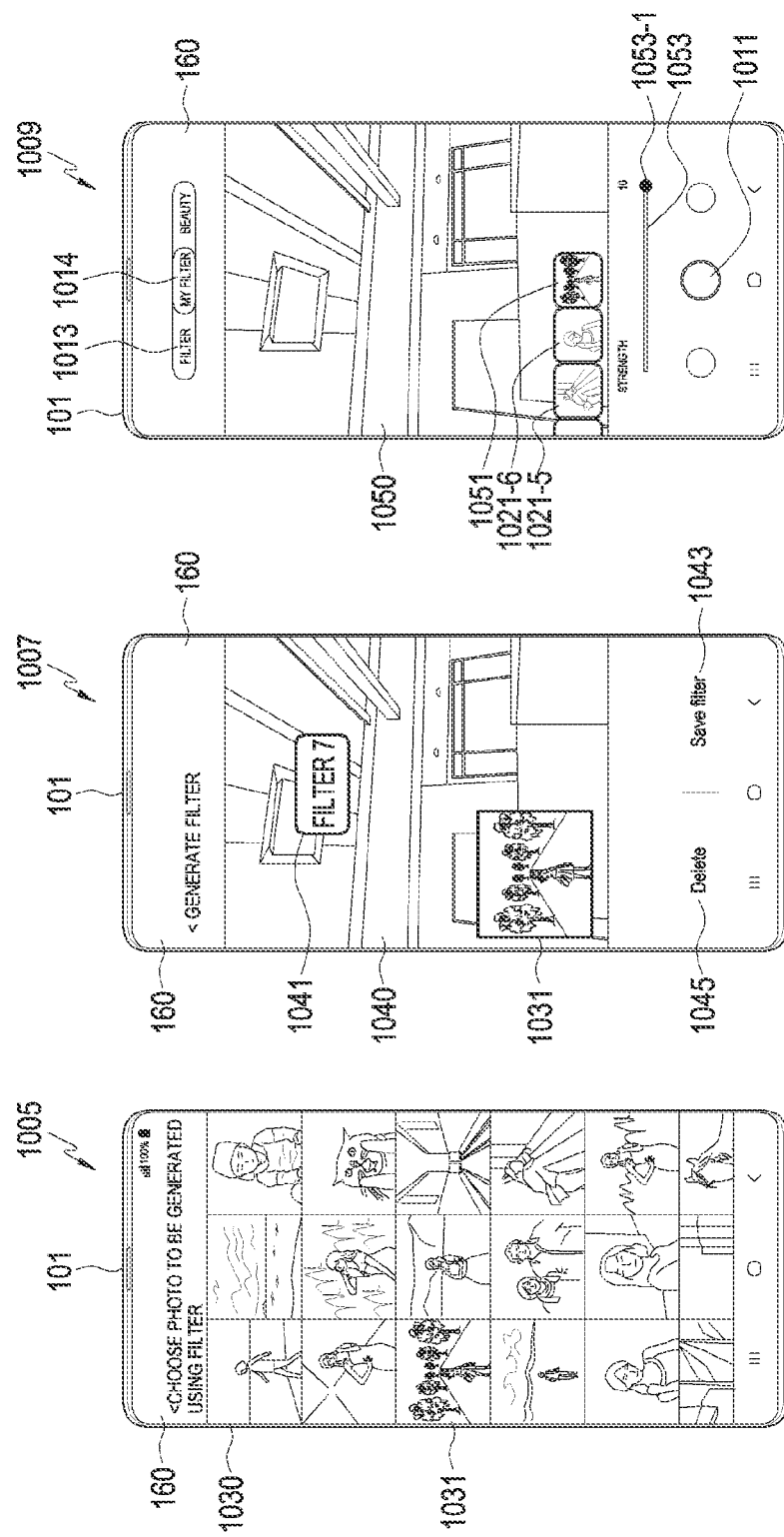

FIGS. 10A and 10B are views illustrating a method for providing a filter using a camera application according to various embodiments of the disclosure.

Referring to FIGS. 10A and 10B, reference number 1001 may denote a screen including a first image 1010 and images corresponding to pre-stored filters (e.g., at least one first filter).

The processor 120 may display, through the display (e.g., the display device 160), the first image 1010, as a preview image input in real-time, through a camera application. The processor 120 may receive a user input for displaying the filter for applying at least one property to the first image 1010. As shown in 1001, the processor 120 may display, through the display, the first image 1010, an object 1011 for capturing (or recording) the first image 1010, an object 1013 for displaying at least one first filter generated by the generator (or developer) of the camera application, an object 1014 for displaying an object for newly generating a filter and at least one second filter generated and stored by the user of the electronic device 101, and images (e.g., an image 1015-2 and an image 1015-3) indicating at least one first filter.

The processor 120 may display, through the display, the shrunken images (e.g., images displayed in the form of a thumbnail) (e.g., the image 1015-2 and the image 1015-3) of the image for which the property corresponding to each of at least one first filter has been applied for the first image

1010. The processor 120 may display, through the display, the image 1015-2 and the image 1015-3 including text (e.g., "warm" and "calm") indicating at least one property applied to each of the images 1015-2 and the image 1015-3. The processor 120 may display, through the display, the shrunken image 1015-1 of the first image, to which at least one property has not been applied for the first image 1010. According to an embodiment, the processor 120 may display, through the display, the shrunken image 1015-1 of the first image 1010, so that the shrunken image 1015-1 of the first image 1010 includes text (e.g., "original copy") indicating that at least one property has not been applied.

Reference number 1003 may denote a screen including a first image 1020, images corresponding to pre-stored filters (e.g., at least one second filter), and an object 1021-1 for newly generating a filter. Reference number 1003 may denote a screen that is displayed through the display when a user input (e.g., a touch input) to the object 1014 in 1001 is received.

As shown in 1003, the processor 120 may display, through the display, the first image 1020, images (e.g., the image 1021-3 and the image 1021-4) indicating at least one second filter generated and stored by the user of the electronic device 101, an object 1021-1 for newly generating a filter, a shrunken image 1021-2 of the first image, the object 1011, the object 1013, and the object 1014.

The processor 120 may display, through the display, the image indicating at least one second filter, in the form of a shrunken form of the image for which at least one property has been identified (or extracted) upon generating at least one second filter. The processor 120 may display, through the display, the image 1021-3 and the image 1021-4 including the names (e.g., "filter1" and "filter2") indicating the image 1021-3 and the image 1021-4, respectively. The processor 120 may display, through the display, the shrunken image 1021-2 of the first image 1020, so that the shrunken image 1021-1 of the first image 1020 includes text (e.g., "original copy") indicating that at least one property has not been applied.

Reference number 1005 may denote a screen including one or more second images 1030. Reference number 1005 may denote a screen that is displayed through the display when a user input (e.g., a touch input) to the object 1021-1 in 1003 is received.

The processor 120 may display one or more second images 1030 stored in the memory 130, through the display, in a shrunken form (e.g., a thumbnail form). For example, the processor 120 may display, through the display, one or more second images 1030 stored in the memory 130 and related to an image application or camera application, based on a user input to the object 1021-1 for generating a filter.

Reference number 1007 may denote a screen displayed when the image 1031 is selected from among one or more second images 1030.

According to an embodiment, the processor 120 may select the image 1031, as the third image, based on a user input (e.g., a touch input to the image 1031) among one or more second images 1030. The processor 120 may identify at least one property value of the selected image 1031. The processor 120 may generate a filter based on at least one property value of the image 1031.

The processor 120 may display, through the display, the first image 1040 to which at least one property value of the selected image 1031 has been applied using the generated filter as shown in 1007.

The processor 120 may display, through the display, the selected image 1031 along with the first image 1040. For example, the processor 120 may overlay and display the image 1031, as the third image, on the first image 1040, to which at least one property value has been applied, through the display. However, methods for displaying the third image are not limited to the above-described examples.

The processor 120 may display, through the display, the text (e.g., "filter7") 1041 indicating the name of the newly generated filter in the first image 1040.

The processor 120 may display, through the display, an object 1043 for storing the generated filter in the memory 130 and an object 1045 for deleting the generated filter (e.g., a filter generated and then temporarily stored in the memory 130).

Reference number 1009 may denote a screen that is displayed through the display after the generated filter is stored. According to an embodiment, reference number 1009 may denote a screen that is displayed through the display when a user input (e.g., a touch input) to the object 1043 in 1007 is received.

The processor 120 may display, through the display, the first image 1050 to which at least one property value of the image 1031 has been applied using the generated filter and an image 1051 indicating the generated filter. For example, the processor 120 may display, through the display, the first image 1050 to which at least one property value of the image 1031 has been applied using the generated filter, an image indicating at least one pre-stored second filter (e.g., at least one second filter generated by the user of the electronic device 101) (e.g., the image 1021-5 and the image 1021-6), and an image 1051 indicating the generated filter.

The processor 120 may also display, through the display, an interface 1053 for adjusting the degree (or strength) of at least one property value applied by the filter (e.g., the generated filter or a filter selected from among pre-stored filters) for the image 1050. The processor 120 may adjust the degree of at least one property value applied to the first image 1050, being displayed through the display, using the generated filter, according to the position of the object 1053-1 included in the interface 1053. For example, when the object 1053-1 is positioned at the leftmost side on the bar of the interface 1053 based on a user input to the object 1053-1, the processor 120 may display an image (e.g., the image 1010 or original image), to which at least one property value has not been applied by the generated filter. When the object 1053-1 is positioned at the rightmost side on the bar of the interface 1053 based on a user input to the object 1053-1, the processor 120 may display an image (e.g., the image 1050), to which at least one property value has been fully applied by the generated filter.

Figure 11A:
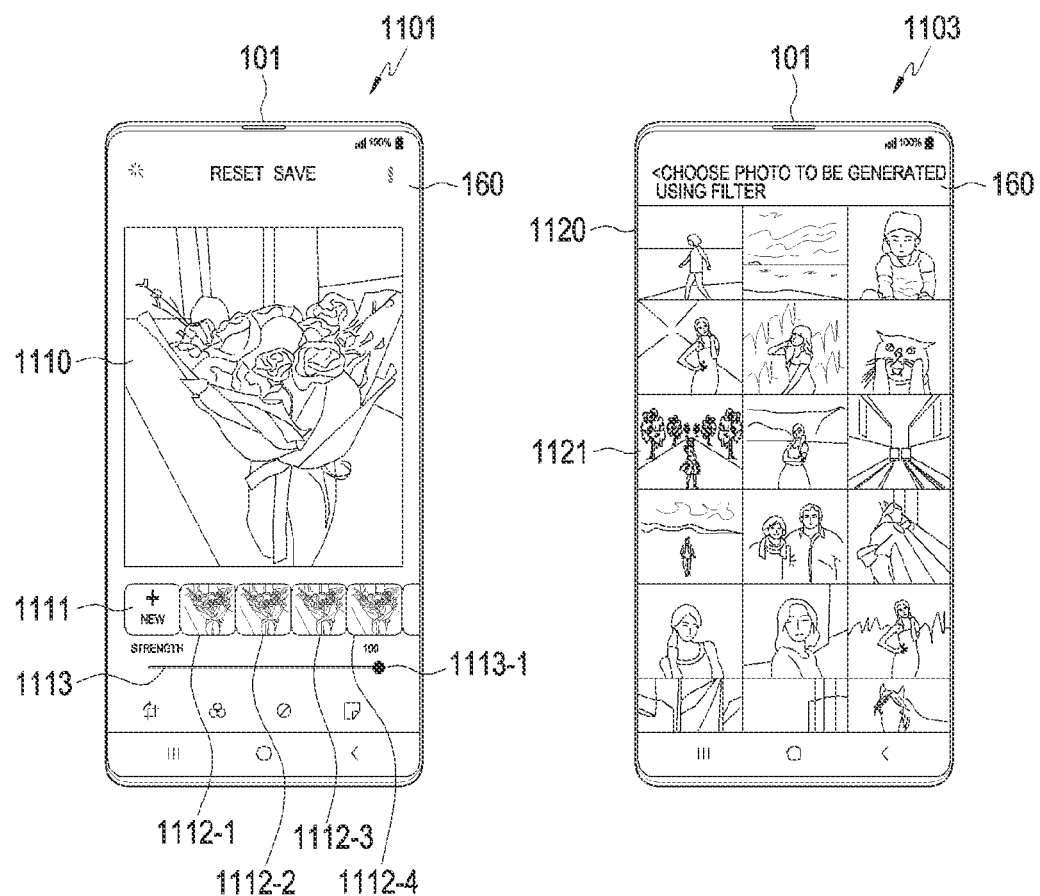
FIGS. 11A and 11B are views illustrating a method for providing a filter using an image application according to various embodiments of the disclosure.
Figure 11B:
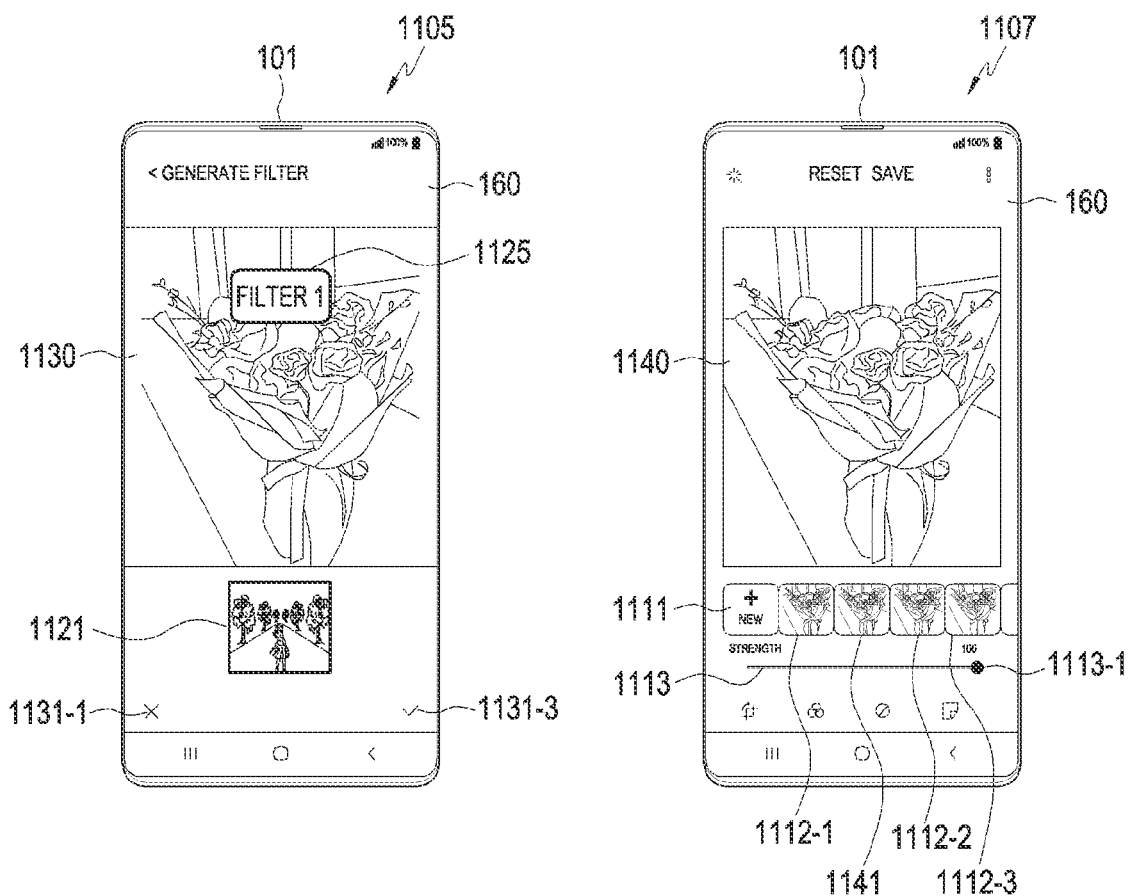

FIGS. 11A and 11B are views illustrating a method for providing a filter using an image application according to various embodiments of the disclosure.

Referring to FIGS. 11A and 11B, reference number 1101 may denote a screen including a first image 1110, an object 1111 for generating a filter, and images (e.g., an image 1112-2, an image 1112-3, and an image 1112-4) corresponding to pre-stored filters (e.g., at least one first filter and at least one second filter).

When an image application is executed, the processor 120 may display the first image 1110 selected by the user through a display (e.g., the display device 160). The processor 120 may display, through the display, a screen as shown in 1101, based on an input (e.g., an input for using a filter on the selected first image 1110) for editing the selected first image 1110.

As shown in 1101, the processor 120 may display, through the display, the first image 1110, images (e.g., the image 1112-2, the image 1112-3, and the image 1112-4) indicating a plurality of pre-stored filters, and an object 1111 for generating a filter.

The processor 120 may display, through the display, the shrunken images (e.g., the image 1112-2, the image 1112-3, and the image 1112-4) of the image for which the properties individually corresponding to the plurality of filters have been applied for the first image 1110. The processor 120 may display, through the display, the image 1112-2, the image 1112-3, and the image 1112-4 including text (e.g., "automatic," "warm," and "calm") indicating at least one property applied to each of the images 1112-2, the image 1112-3, and the image 1112-4. The processor 120 may display, through the display, the shrunken image 1112-1 of the first image 1110, to which at least one property has not been applied for the first image. The processor 120 may display, through the display, the shrunken image 1015-1 of the first image 1110, so that the shrunken image 1112-1 of the first image 1110 includes text (e.g., "original copy") indicating that at least one property has not been applied. The processor 120 may also display, through the display, an interface 1113 for adjusting the degree (or strength) of at least one property value applied by a filter selected from among a plurality of filters for the image 1110. When no filter is selected, the processor 120 may display, through the display, an interface 1113 to indicate that the interface 1113 is unable to receive a user input (e.g., the interface 1113 deactivated). For example, when no filter is selected, the processor 120 may control the display to display the interface 1113 in a first color (e.g., black) and, when a filter is selected, control the display to display the interface 1113 in a second color (e.g., yellow) to indicate that the interface 1113 is able to receive user inputs.

Reference number 1103 may denote a screen including one or more second images 1120. Reference number 1103 may denote a screen that is displayed through the display when a user input (e.g., a touch input) to the object 1111 in 1101 is received.

The processor 120 may display one or more second images 1120 stored in the memory 130, through the display, in a shrunken form (e.g., a thumbnail form). For example, the processor 120 may display, through the display, one or more second images 1120 stored in the memory 130 and related to an image application, based on a user input to the object 1111 for generating a filter.

Reference number 1105 may denote a screen displayed when the image 1121 is selected from among one or more second images 1120.

The processor 120 may select the image 1121, as the third image, based on a user input (e.g., a touch input to the image 1121) among one or more second images 1120. The processor 120 may identify at least one property value of the selected image 1121. The processor 120 may generate a filter based on at least one property value of the image 1121.

The processor 120 may display, through the display, the first image 1130 to which at least one property value of the selected image 1121 has been applied using the generated filter as shown in 1105.

The processor 120 may display, through the display, the selected image 1121 along with the first image 1130. For example, the processor 120 may display, through the display, the image 1121, as the third image, in an area independent from the area of the first image 1130 to which at least one property value has been applied, along with the first image 1130 to which at least one property value has been applied. However, methods for displaying the third image are not limited to the above-described examples.

The processor 120 may display, through the display, the text (e.g., "filter 1") 1125 indicating the name of the newly generated filter in the first image 1130.

The processor 120 may display, through the display, an object 1131-3 for storing the generated filter in the memory 130 and an object 1131-1 for deleting the generated filter (e.g., a filter generated and then temporarily stored in the memory 130).

Reference number 1107 may denote a screen that is displayed through the display after the generated filter is stored. According to an embodiment, reference number 1007 may denote a screen that is displayed through the display when a user input (e.g., a touch input) to the object 1131-3 in 1005 is received.

According to an embodiment, the processor 120 may display, through the display, the first image 1140 to which at least one property value of the image 1121 has been applied using the generated filter and an image 1141 indicating the generated filter. For example, the processor 120 may display, through the display, a first image 1140 to which at least one property value of the image 1121 has been applied using the generated filter, a shrunken image 1112-1 of the first image 1110, a plurality of pre-stored filters (e.g., an image 1112-2 and an image 1112-3), and an image 1141 indicating the generated filter.

The processor 120 may display, through the display, an interface 1113 for adjusting the degree (or strength) of at least one property value applied by the generated filter to the image 1140 to indicate that the interface 1113 is able to receive user inputs (or activated). The processor 120 may adjust the degree of at least one property value applied to the first image 1040, being displayed through the display, using the generated filter, according to the position of the object 1113-1 included in the interface 1113.

Figure 12:
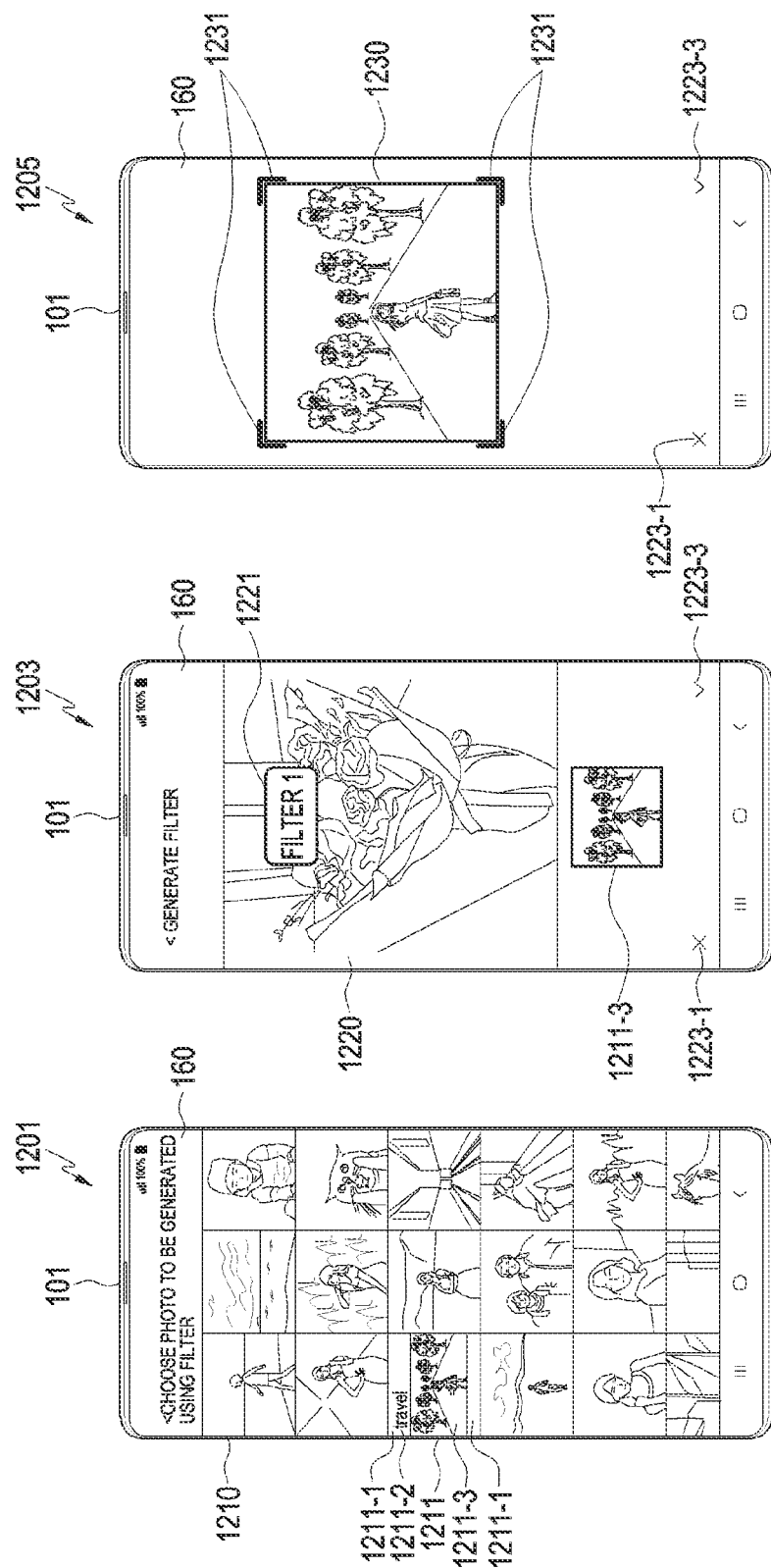
FIG. 12 is a view illustrating an example method for identifying at least one property value of a third image, according to an embodiment of the disclosure.

FIG. 12 is a view illustrating an example method for identifying at least one property value of a third image, according to an embodiment of the disclosure.

Referring to FIG. 12, it is a view related to FIGS. 3 and 7, illustrating example methods for generating a filter based on a portion of a third image when the portion of the third image is designated.

Referring to FIG. 12, reference number 1201 may denote a screen including one or more second images. For example, the processor 120 may execute a camera application or an image application and display the first image through the display (e.g., the display device 160). The processor 120 may display, through the display, one or more second images based on a user input to an object (e.g., an object 1021-1 or an object 1111) for generating a filter.

The processor 120 may receive a user input for selecting the image 1211, as the third image, from among one or more second images 1210. The image 1211 may include a blank portion 1211-1 including text 1211-2 in addition to an image portion 1211-3.

In response to selection of the image 1211, the processor 120 may designate the image portion 1211-3, except for the blank portion 1211-1 in the image 1211, as the portion of the third image for which at least one property value is to be identified. According to an embodiment, the processor 120 may crop only the image portion 1211-3 in the image 1211.

The processor 120 may identify at least one property value for the image portion 1211-3 in the image 1211. The processor 120 may generate a filter based on at least one property value for the image portion 1211-3 in the image 1211.

The processor 120 may display, through the display, the first image 1220 to which at least one property value has been applied for the image portion 1211-3, using the generated filter. The processor 120 may display, through the display, text 1221 (e.g., "filter1") indicating the name of the generated filter on the first image 1220.

The processor 120 may display, through the display, the image portion 1211-3 along with the first image 1220. According to an embodiment, the processor 120 may further display, through the display, an object 1223-3 for storing the generated filter in the memory 130 and an object 1223-1 for deleting the generated filter (e.g., a filter generated and then temporarily stored in the memory 130).

Reference number 1205 may denote a screen for designating a portion of the third image (e.g., the image portion 1211-3) based on a user input. According to an embodiment, reference number 1205 may denote a screen displayed when a user input (e.g., a touch input) to the image portion 1211-3 is received in 1203. However, methods for displaying a screen in 1205 are not limited thereto.

The processor 120 may display, through the display, an object 1231 for designating a portion for which at least one property value is to be display by a user input in the image portion 1211-3 while displaying the image portion 1211-3 along with the first image 1220 to which at least one property value has been applied. For example, the processor 120 may display, through the display, an enlarged image portion 1230 and an object 1231 in the enlarged image portion 1230 (or the outline of the enlarged image portion 1230), based on a user input for selecting the image portion 1211-3 while displaying the image portion 1211-3 along with the first image 1220 to which at least one property value has been applied. The processor 120 may identify a portion of the image portion 1211-3 designated (or set) by the position of the object 1231, based on a user input to the object 1231 (e.g., a drag input for moving the object 1231). The processor 120 may crop the identified portion of the image portion 1211-3. However, methods for designating the image portion for which at least one property is to be identified from the image portion 1211-3 based on a user input are not limited thereto.

The processor 120 may designate an image portion for which at least one property value is to be identified from the image portion 1211-3 and generate a filter based on the designated image portion.

Although not shown in FIG. 12, when the image 1211 is selected from among one or more second images 1210, the processor 120 may designate an image portion, for which at least one property value is to be identified, based on a user input in the image 1211. For example, when the image 1211 is selected from among one or more second images 1210, the processor 120 may display, through the display, an object for designating the portion, for which at least one property value is to be identified by a user input in the image 1211, along with the image 1211 and the first image 1220. The processor 120 may designate the portion, for which at least one property value is to be identified in the image 1211, based on a user input to the displayed object. The processor 120 may identify at least one property value of the designated portion and generate a filter based on the at least one identified property value.

Although not shown in FIG. 12, when the image 1211 is selected from among one or more second images 1210, the processor 120 may identify the image portion 1211-3 in the image 1211 and designate the image portion for which at least one property value is to be identified based on a user input in the image portion 1211-3. The processor 120 may identify at least one property value of the designated portion and generate a filter based on the at least one identified property value.

Figure 13:
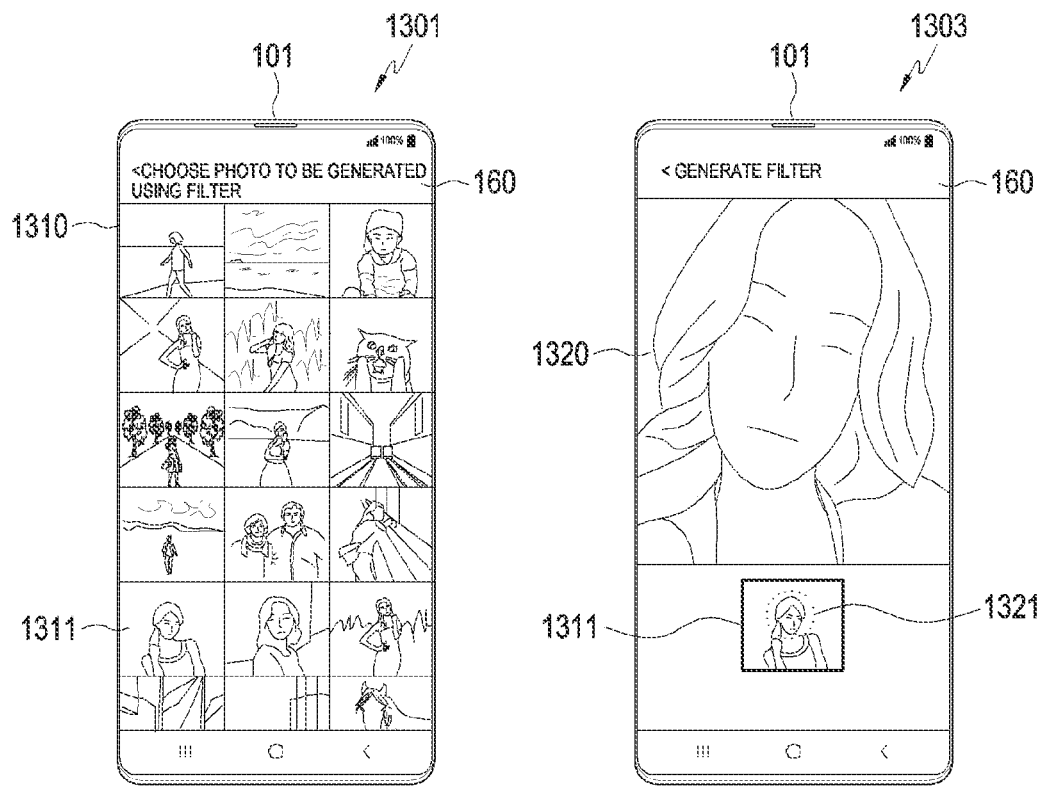
FIG. 13 is a view illustrating an example method for identifying at least one property value by recognizing an object recognized in a third image, according to an embodiment of the disclosure.

FIG. 13 is a view illustrating an example method for identifying at least one property value by recognizing an object recognized in a third image, according to an embodiment of the disclosure.

FIG. 13 may be a view related to FIG. 4, illustrating example methods for identifying at least one property value by recognizing an object recognized in the third image.

Referring to FIG. 13, reference number 1301 may denote a screen including one or more second images. For example, the processor 120 may execute a camera application or an image application and display the first image 1310 through the display (e.g., the display device 160). The processor 120 may display, through the display, one or more second images based on a user input to an object (e.g., an object 1021-1 or an object 1111) for generating a filter.

Reference number 1303 may denote a screen displayed when the image 1311 is selected in 1301.

The processor 120 may recognize an object (e.g., a figure object or thing object) in the image 1311. For example, the processor 120 may recognize a figure's face as an object in the image 1311 using a program (or algorithm) capable of recognizing objects in an image.

The processor 120 may recognize an object in the image 1311 based on a user input (e.g., a touch input to a user interface matched with a function for performing object recognition) while displaying the first image 1320 and the image 1311. The processor 120 may display, through the display, an indication 1321 that at least one object recognized in the image 1311 is recognized. When a plurality of objects are recognized in the image 1311, the processor 120 may display, through the display, an indication that each of the plurality of recognized objects is recognized, for each of the plurality of objects. For example, when the plurality of objects are recognized in the third image, the processor 120 may display the outline of each of the plurality of objects for each of the plurality of objects, through the display. However, methods for displaying an indication that each of the plurality of recognized objects is recognized are not limited thereto.

When an object is recognized in the image 1311, the processor 120 may select the recognized object. When a plurality of objects are recognized in the image 1311, the processor 120 may select at least one object from among the plurality of objects based on a user input. For example, the processor 120 may select at least one object, to which the user's touch input has been made, from among the plurality of objects. However, methods for selecting an object recognized in the image 1311 are not limited thereto.

According to an embodiment, the processor 120 may identify at least one property value for the portion including an object in the third image and generate a filter based on the at least one identified property value.

Figure 14:
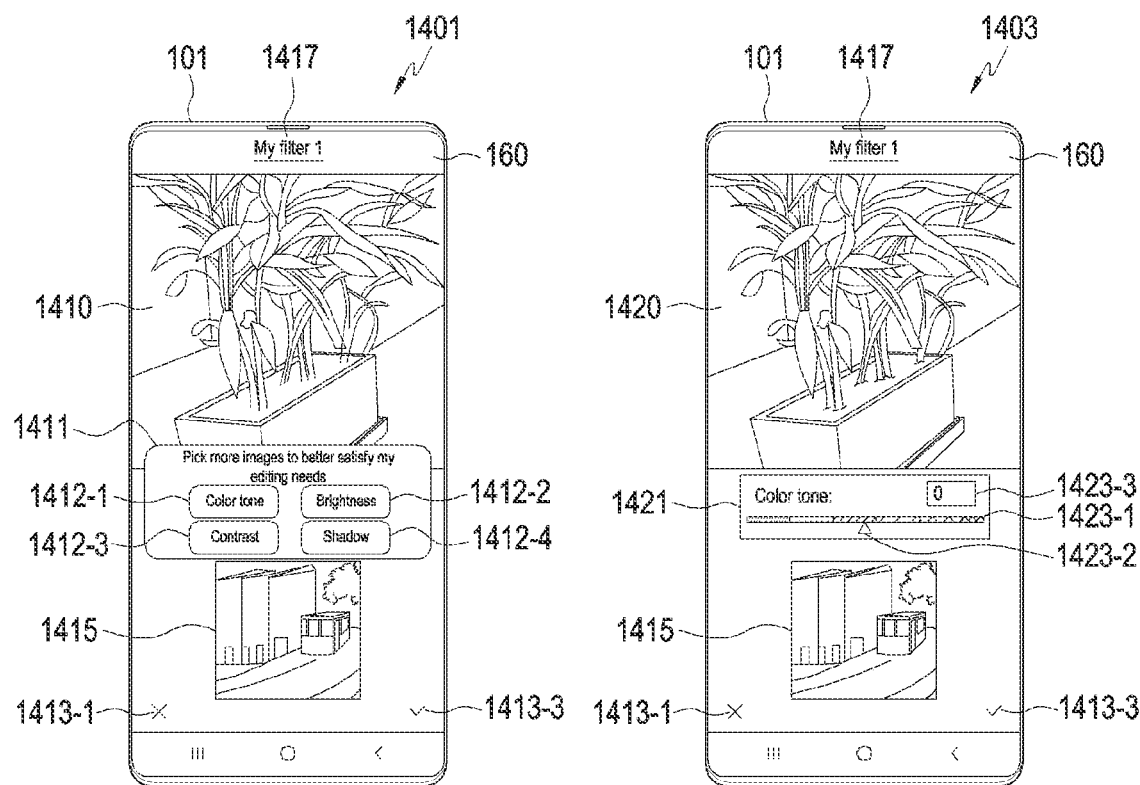
FIG. 14 is a view illustrating an example method for adjusting at least one property value based on a user interface, according to an embodiment of the disclosure.

FIG. 14 is a view illustrating an example method for adjusting at least one property value based on a user interface, according to an embodiment of the disclosure.

Referring to FIG. 14, while displaying the first image 1410 to which at least one property value has been applied, the processor 120 may select a property to be adjusted from among at least one property, based on a user input. For example, upon receiving a user input to the third image 1415 while displaying the third image 1415 along with the first image 1410 to which at least one property value has been applied, the processor 120 may display, through the display (e.g., the display device 160), an interface 1411 including at least one object (e.g., an object 1412-1, an object 1412-2, an object 1412-3, and an object 1412-4) corresponding to (or indicating) at least one property, as shown in 1401. The processor 120 may select an object (e.g., the object 1412-1) indicating a first property (e.g., color tone or hue) in the interface 1411 based on a user input.

The processor 120 may further display, through the display, an object 1413-3 for storing the generated filter in the memory 130 an object 1413-1 for deleting the generated filter (e.g., a filter generated and then temporarily stored in the memory 130), along with the first image 1410, the third image 1415, an object 1417 identifying the generated filter, and the interface 1411.

When an object (e.g., the object 1421-1) is selected as shown in 1403, the processor 120 may display, through the display, an interface 1421 for adjusting the value of the selected first property. For example, to adjust the value of the first property, the processor 120 may display, through the display, an interface 1421 including a bar 1423-1 indicating a range of the first property value and an object 1423-2 that is movable along the bar 1423-1. According to an embodiment, the positions of the object 1423-2 on the bar 1423-1 may individually correspond to the values of the first property. To adjust the value of the first property, the processor 120 may display an interface 1421 including the field 1423-3 for inputting the value of the first property through the display. However, methods for displaying the interface for adjusting the value of the selected first property are not limited thereto.

The processor 120 may adjust the first property value of the third image 1415 based on the value of the first property corresponding to the position of the object 1423-2 on the bar 1423-1, based on a user input.

The processor 120 may generate a filter that may apply the adjusted value of the first property based on a user input to the interface 1421. The processor 120 may display, through the display, the first image 1420 to which at least one property value has been applied including the adjusted value of the first property, using the generated filter.

Figure 15:
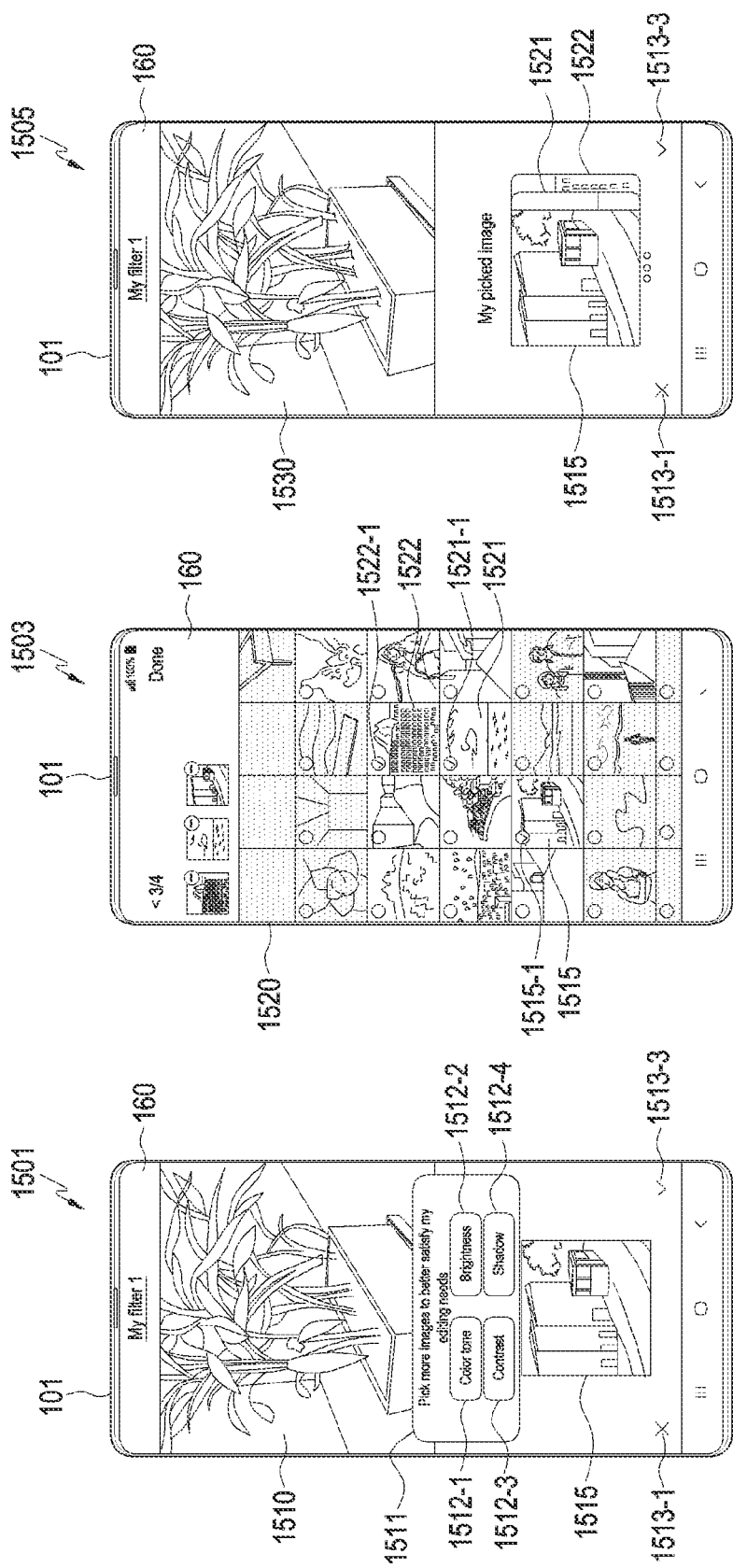
FIG. 15 is a view illustrating an example method for adjusting at least one property value based on a plurality of images, according to an embodiment of the disclosure.

FIG. 15 is a view illustrating an example method for adjusting at least one property value based on a plurality of images, according to an embodiment of the disclosure.

Referring to FIG. 15, while displaying the first image 1510 to which at least one property value has been applied, the processor 120 may select a property to be adjusted from among at least one property, based on a user input. For example, upon receiving a user input to the third image 1515 while displaying the third image 1515 along with the first image 1510 to which at least one property value has been applied, the processor 120 may display, through the display, an interface 1511 including at least one object (e.g., an object 1512-1, an object 1512-2, an object 1512-3, and an object 1512-4) corresponding to (or indicating) at least one property, as shown in 1501. The processor 120 may select an object (e.g., the object 1512-1) indicating a first property (e.g., color tone or hue) in the interface 1511 based on a user input.

The processor 120 may further display, through the display, an object 1513-3 for storing the generated filter in the memory 130 and an object 1513-1 for deleting the generated filter (e.g., a filter generated and then temporarily stored in the memory 130), along with the first image 1510, the third image 1515, and the interface 1511.

In response to selection of the object 1521-1, the processor 120 may display one or more fourth images related to the first property stored in the memory 130 through the display.

When the processor 120 selects the first property from among at least one property, the processor 120 may display one or more fourth images, which have the value of the first property in a designated range from the value of the first property of the image 1515 among one or more second images stored in the memory 130, through the display. For example, when the processor 120 selects color tone (or hue) as the first property, the processor 120 may identify one or more fourth images having a color tone value in a designated range from the first value of the color tone of the image 1515 among one or more second images stored in the memory 130. The processor 120 may display the one or more identified fourth images through the display.

As shown in 1503, the processor 120 may control the display to separately display one or more fourth images having the value of the first property, which belongs to a designated range from the value of the first property of the image 1515, among one or more second images 1520 and images having the value of the first property, which does not belong to the designated range from the value of the first property of the image 1515. For example, the processor 120 may control the display so that, among one or more second images 1520, the one or more fourth images differ in shade from the images having the value of the first property which does not belong to the designated range from the value of the first property of the image 1515. However, methods for controlling the display to separately display one or more fourth images and the images having the value of the first property which does not belong to the designated range from the value of the first property of the image 1515 among the one or more second images 1520 are not limited thereto.

The processor 120 may enable selection to be possible for one or more fourth images among one or more second images 1520 and not to be possible for the images having the value of the first property which does not belong to the designated range from the value of the first property of the image 1515. According to an embodiment, the processor 120 may enable inclusion of an object indicating that one or more fourth images are selectable among one or more second images 1520, and exclusion of an object indicating that the images having the value of the first property which does not belong to the designated range from the value of the first property of the image 1515 are selectable.

The processor 120 may select at least one fifth image (e.g., an image 1521, an image 1522, and an image 1515) from among one or more fourth images. For example, the processor 120 may select at least one fifth image from among the one or more fourth images based on a user input (e.g., a touch input to at least one fifth image among the one or more fourth images).

According to an embodiment, the processor 120 may select at least one fifth image, including the image 1515, from among one or more fourth images. According to an embodiment, the processor 120 may select at least one fifth image, which does not include the image 1515, from among one or more fourth images. For example, upon displaying one or more fourth images, the image 1515, as the third image, may be in the state of being selected as default. The processor 120 may deselect the image 1515 based on a user input and may select at least one image, except for the image 1515, as at least one fifth image, from among one or more fourth images. The processor 120 may display, through the display, a selection of the image 1521, image 1522, and image 1515, as one fifth image, through the object 1521-1, object 1522-1, and object 1515-1.

The processor 120 may generate a filter based on the value of the first property of at least one fifth image. For example, the processor 120 may identify the value of the first property of at least one fifth image. The processor 120 may determine (or calculate) the value of the first property which results from averaging the value of the first property of at least one fifth image. The processor 120 may generate a filter based on at least one property value including the determined value of the first property. Although in the above-described example, a filter is generated using the average of the value of the first property of at least one fifth image, embodiments of the disclosure are not limited thereto.

As shown in 1505, the processor 120 may display, through the display, the first image 1530 using a filter generated based on the value of the first property determined based on at least one fifth image (e.g., the image 1521, the image 1522, and the image 1515).

A method according to an embodiment of the disclosure comprises displaying a first image through a display (e.g., the display device 160) of an electronic device 101, displaying one or more second images through the display while displaying the first image, selecting a third image from among the one or more second images, identifying a value of at least one property of the third image, generating a filter for applying the value of the at least one property to an image, applying the value of the at least one property to the first image using the filter, displaying the first image, to which the value of the at least one property is applied, through the display, and storing the filter in a memory 130 of the electronic device 101.

According to an embodiment of the disclosure, displaying the one or more second images may include displaying the one or more second images through the display based on a user input to an object for generating the filter while displaying the first image.

According to an embodiment of the disclosure, identifying the value of the at least one property of the third image may include identifying a value of at least one property of an image portion when the third image includes a blank portion and the image portion.

According to an embodiment of the disclosure, identifying the value of the at least one property of the third image may include designating a portion of the third image based on a user input, and identifying a value of at least one property of the designated portion of the third image.

According to an embodiment of the disclosure, identifying the value of the at least one property of the third image may include recognizing at least one object in the third image, and identifying a value of at least one property for an area including the at least one recognized object.

According to an embodiment of the disclosure, the method may comprise displaying, through the display, a user interface for adjusting a value of a first property among the at least one property after displaying the first image to which the value of the at least one property is applied, adjusting the value of the first property based on a user input to the user interface, and generating the filter based on the adjusted value of the first property.

According to an embodiment of the disclosure, the method may comprise displaying one or more fourth images through the display after displaying the first image to which the value of the at least one property is applied, selecting at least one fifth image from among the one or more fourth images, and generating the filter based on a value of at least one property of the at least one fifth image.

According to an embodiment of the disclosure, the method may comprise displaying an image indicating the filter through the display after storing the filter in the memory 130.

The structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a digital versatile disc (DVD)).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display;
at least one processor coupled to the display; and
memory coupled to the at least one processor,
wherein the memory stores instructions which, when executed by the at least one processor individually or collectively, cause the electronic device to:
display, through the display, a first image,
based on a user input for editing, display, through the display, with the first image, an object for generating a new filter,
based on a first user input on the object, display, through the display, one or more second images,
based on a second user input, select a third image among the one or more second images,
identify a value of at least one property of the third image,
generate the new filter based on the value of the at least one property of the third image,
apply the new filter to the first image to obtain a fourth image,
display, through the display, the fourth image and a thumbnail image of the third image, wherein the thumbnail image of the third image corresponds to the new filter generated based on the value of the at least one property of the third image, and
store, in the memory, the new filter.

2. The electronic device of claim 1, wherein the instructions, when executed by the at least one processor individually or collectively, further cause the electronic device to:
display, through the display, an object for newly generating a second filter along with images individually indicating a plurality of pre-stored filters including the new filter, based on a user input for displaying filters for applying at least one property to another image,
receive a selection of the new filter, and
apply the new filter to the another image.

3. The electronic device of claim 1, wherein the instructions, when executed by the at least one processor individually or collectively, further cause the electronic device to:
display, through the display, an interface for adjusting a strength of the value of the at least one property.

4. The electronic device of claim 1, wherein a text indicating the new filter obtained based on the value of the at least one property of the third image is, through the display, displayed with the thumbnail image.

5. The electronic device of claim 1, further comprising:
a camera,
wherein the instructions, when executed by the at least one processor individually or collectively, further cause the electronic device to:

execute a camera application,
obtain the first image through the camera while the camera application is executed, and
display, through the display, the first image including a preview image obtained in real time through the camera or a still image.

6. The electronic device of claim 1, wherein the instructions, when executed by the at least one processor individually or collectively, further cause the electronic device to:
based on the first user input on the object, display, through the display, one or more thumbnail images of the one or more second images.

7. The electronic device of claim 1, wherein the instructions, when executed by the at least one processor individually or collectively, further cause the electronic device to:
display, through the display, thumbnail images individually indicating a plurality of pre-stored filters to be applied to another image, the thumbnail images including the thumbnail image indicating the new filter after storing the new filter in the memory.

8. A method for providing a filter in an electronic device, comprising:
displaying, through a display of the electronic device, a first image;
based on a user input for editing, displaying, through the display, with the first image, an object for generating a new filter;
based on a first user input on the object, displaying, through the display, one or more second images;
based on a second user input, selecting a third image among the one or more second images;
identifying a value of at least one property of the third image;
generating the new filter based on the value of the at least one property of the third image;
applying the new filter to the first image to obtain a fourth image;
displaying, through the display, the fourth image and a thumbnail image of the third image, wherein the thumbnail image of the third image corresponds to the new filter generated based on the value of the at least one property of the third image; and
storing, in memory of the electronic device, the new filter.

9. The method of claim 8, further comprising:
displaying, through the display, an object for newly generating a second filter along with images individually indicating a plurality of pre-stored filters including the new filter, based on a user input for displaying filters for applying at least one property to another image;
receiving a selection of the new filter; and
applying the new filter to the another image.

10. The method of claim 8, further comprising:
displaying, through the display, an interface for adjusting a strength of the value of the at least one property.

11. The method of claim 8, wherein a text indicating the new filter obtained based on the value of the at least one property of the third image is, through the display, displayed with the thumbnail image.

12. The method of claim 8, wherein the displaying of the first image comprises:
executing a camera application;
obtaining the first image through a camera of the electronic device while the camera application is executed; and
displaying, through the display, the obtained first image including a preview image obtained in real time through the camera or a still image.

13. The method of claim 8, wherein based on the first user input on the object, the displaying of the one or more second images comprises:
based on the first user input on the object, displaying, through the display, one or more thumbnail images of the one or more second images.

14. The method of claim 8, further comprising:
displaying, through the display, thumbnail images individually indicating a plurality of pre-stored filters to be applied to another image, the thumbnail images including the thumbnail image indicating the new filter after storing the new filter in the memory.

* * * * *